(12) United States Patent
Cristobal et al.

(10) Patent No.: US 10,087,369 B2
(45) Date of Patent: Oct. 2, 2018

(54) SOIL ADDITIVES FOR PROMOTING SEED GERMINATION, FOR PREVENTION OF EVAPORATION AND METHODS FOR USE

(71) Applicant: RHODIA OPERATIONS, Aubervilliers (FR)

(72) Inventors: Galder Cristobal, Singapore (SG); Pascal Metivier, Shanghai (CA); Jean-Christophe Castaing, Sevres (FR); Pengfei Ji, Shanghai (CN); Zhiyun Chen, Newtown, PA (US)

(73) Assignee: RHODIA OPERATIONS, Aubervilliers (FR)

( * ) Notice: Subject to any disclaimer, the term of this patent is extended or adjusted under 35 U.S.C. 154(b) by 496 days.

(21) Appl. No.: 14/807,280

(22) Filed: Jul. 23, 2015

(65) Prior Publication Data

US 2018/0037816 A1    Feb. 8, 2018

Related U.S. Application Data

(62) Division of application No. 13/817,953, filed as application No. PCT/CN2011/073298 on Apr. 26, 2011, now Pat. No. 9,096,793.

(30) Foreign Application Priority Data

Aug. 20, 2010    (CN) ................ PCT/CN2010/076191

(51) Int. Cl.
| | |
|---|---|
| C09K 17/00 | (2006.01) |
| C09K 17/14 | (2006.01) |
| C09K 17/52 | (2006.01) |
| C09K 17/38 | (2006.01) |
| C09K 17/32 | (2006.01) |
| C09K 17/22 | (2006.01) |
| A01G 1/00 | (2006.01) |
| A01G 22/00 | (2018.01) |

(52) U.S. Cl.
CPC .............. *C09K 17/14* (2013.01); *A01G 1/001* (2013.01); *A01G 22/00* (2018.02); *C09K 17/22* (2013.01); *C09K 17/32* (2013.01); *C09K 17/38* (2013.01); *C09K 17/52* (2013.01)

(58) Field of Classification Search
CPC ...................................................... C09K 17/14
USPC ..................................................... 47/58.1 SC
See application file for complete search history.

(56) References Cited

U.S. PATENT DOCUMENTS

| | | | | |
|---|---|---|---|---|
| 2003/0106261 | A1* | 6/2003 | Petrea | A01G 9/1086 47/58.1 SC |
| 2004/0261314 | A1* | 12/2004 | Petrea | A01G 1/002 47/58.1 SC |
| 2005/0172551 | A1* | 8/2005 | Krysiak | A01C 1/046 47/58.1 SC |
| 2009/0013599 | A1* | 1/2009 | Cordani | A01C 21/00 47/58.1 SC |
| 2011/0099899 | A1* | 5/2011 | Krysiak | A01C 21/00 47/58.1 SC |
| 2013/0097924 | A1* | 4/2013 | Thrash | A01G 9/1086 47/58.1 SC |

* cited by examiner

*Primary Examiner* — Kristen C Hayes
(74) *Attorney, Agent, or Firm* — Vorys, Sater, Seymour and Pease LLP

(57) ABSTRACT

Disclosed are methods of improving germination rates of plants/crops, as well as preventing or arresting water evaporation loss from targeted soil areas, which allows for improved water usage efficiency by crops, plants, grasses, vegetation, etc.

30 Claims, 15 Drawing Sheets

(INITIAL WATER ABSORPTION IN UNWASHED SHANXI SOIL)

(EVAPORATION KINETICS)

SOIL ADDITIVES FOR PROMOTING SEED GERMINATION, FOR PREVENTION OF EVAPORATION AND METHODS FOR USE

CROSS REFERENCE TO RELATED APPLICATIONS

This application is a Divisional Application of U.S. patent application Ser. No. 13/817,953, filed on Feb. 20, 2013, now U.S. Pat. No. 9,096,793, which claims the benefit of PCT/CN2010/076191, herein incorporated by reference.

FIELD OF THE INVENTION

This invention relates to soil additives and, in particular, to soil additives useful in the promotion of seed germination, plant and crop yield, as well as in the prevention of evaporation and/or drainage and methods for use.

BACKGROUND OF THE INVENTION

Water scarcity is a major constraint to human and agricultural development. Roughly 70% of the fresh water consumed is directed towards agricultural-related usage, for example as irrigation water, which in turn accounts for roughly 90% of agricultural usage. As the demand for fresh water through agricultural development as well as human development increases, more effective uses of water are becoming necessary. This need is even more pronounced in light of the increasing scarcity of fresh water. Accordingly, there is a growing need for an improved and more efficient usage of fresh water.

Some of the water used in agriculture is lost by evaporation, infiltration, drainage and water runoff. What remains can be absorbed by plants, grasses and trees, which are utilized for harvest production.

The effective usage of water in agriculture has not only a sizable ecological impact, but has also an impact on agricultural economies as there is a direct correlation between the quantity of water available to the plants and their yield. If, instead of losing water, the water is confined at the plant's root level for a longer time, there will be a direct repercussion on crop production and yield. Also, in critical conditions in terms of water availability and temperatures, an optimized usage of water can secure the crop from complete destruction and loss of harvest.

Further, water availability around the time of or during seed germination is desirable as the germination phase is a very important phase is the growth of a plant or crop. The life cycle of any plant can be divided in different phases and seed germination is a basic stage to start the growth of a plant. Seeds are often dry and need significant amounts of water, relative to the seed dry weight, before cellular metabolism and growth can occur/resume. A variety of abiotic stimuli, including light, temperature and nitrates, provide information about the external environment that affects germination. Appropriate amounts of water, oxygen and temperature can facilitate seed to germinate. Also, internal mechanisms and chemical promoter/inhibitor influence germination and germination rate.

Accordingly, there is a need for an improved soil additive that can slow or arrest the rate of evaporation from soils, for example soils predominately containing clay or soils located in high temperature or high wind areas. This, in turn, helps to provide improved water usage by plants and grasses.

There is also a need for a soil additive that is useful in the promotion of seed germination, as well as the promotion of plant and crop yield.

SUMMARY OF INVENTION

The invention relates to methods for improving yield of crops, as well as agricultural and horticultural plants, shrubs, trees and grasses (hereinafter sometimes collectively referred to as "plants"). Applications targeted include agricultural uses to increase the yield of crops or plants or to secure the crop or plant in very hostile areas (non irrigated zones, warm to hot climates, windy areas, scarce precipitation, or a combination of these). Targeted markets include but are not limited to: agriculture for non-irrigated crops (including but not limited to wheat, cotton, etc); agriculture for irrigated crops (including but not limited to horticulture-based plants); arboriculture, forestry and gardening; golf courses; sport and park turf; seeding additive for plant nurseries; and fruits, among others. The methods described herein are capable of increasing the agricultural yield, horticultural yield and/or crop or plant yield in a target soil area.

In one aspect, one claimed embodiment is a method of increasing crop yield by decreasing water evaporation from soil, the method comprising: mixing a bulk additive into a target soil area; and contacting a top layer of the target soil area with a surface additive. In some embodiments, the soil is clay soil characterized by a mean particle diameter ($D_{50}$) of less than or equal to about 50 μm, or equal to about 45 μm in other embodiments, or equal to about 35 μm in other embodiments, or less than or equal to about 25 μm, or equal to about 10 μm in other embodiments, or less than or equal to about 5 μm in other embodiments.

In another aspect, one embodiment is a method of increasing crop yield by decreasing water evaporation from soil, the method comprising contacting a top layer of a target soil area with a surface additive, whereby the surface additive forms a layer on the top of the soil. In some embodiments, the soil additive forms a semi-permeable layer, membrane or crust on the top of the soil. The additive is characterized by increased resistance to washing such as rainfall, irrigation, etc.

In another aspect, described herein are methods for improving germination rates of a plant or crop, by applying or contacting a surface additive to a target soil area in which a plant or crop seed is planted. In one embodiment, the targeted soil area is under stressed conditions. Such stressed conditions include but are not limited to water-stressed or water restricted conditions, drought conditions, extreme or prolonged temperature such as extreme or prolonged hot or cold, heavy or extreme wind conditions and the like. A further embodiment includes the additional step of contacting a seed onto or within the target soil area. The seed can be any useful or known plant or crop seed. The seeds used herein can be from any crop or plant, including but not limited to species from the genera *Asparagus, Atropa, Avena, Brassica, Citrus, Citrullus, Capsicum, Cucumis, Cucurbita, Daucus, Fragaria, Glycine, Gossypium, Helianthus, Hordeum, Hyoscyamus, Heterocallis, Lactuca, Linum, Lolium, Lycopersicon, Malus, Majorana, Manihot, Medicago, Nicotiana, Oryza, Panieum, Pannesetum, Persea, Pisum, Pyrus, Prunus, Raphanus, Secale, Senecio, Sinapis, Solanum, Sorghum, Trigonella, Triticum, Vitis, Vigna,* and, *Zea*. In one particular embodiment, the crop seed includes *Brassica rapa, Brassica chinensis* and *Brassica pekinensis*. In yet another aspect, described herein are methods for improving plant or crop yield, by applying or contacting a surface additive to a target soil area in which a plant seed or crop seed is planted.

Germination is a critical event in the plant life cycle, as the timing of emergence from the protective seed coat is crucial for survival and reproductive success. Breaking seed dormancy gate is the key in this phase. A germination promoter in agriculture has a big influence on harvest time. Faster kinetics corresponds to shorter time for crops to ripen, which enable farmers or growers to reduce harvest time and increase cultivate cycling. A higher germination rate provides more crops from given seeds resulting in higher yield.

In one embodiment, the step of contacting the top layer of soil can take the form of spraying an aqueous mixture containing a surface additive onto the soil. In one embodiment, an aqueous mixture containing the surface additive is sprayed onto a target area of soil at a rate of, or at a rate equivalent to, less than 200 kg surface additive per hectare. In another embodiment, an aqueous mixture containing the surface additive is sprayed onto a target area of soil at a rate of or at a rate equivalent to less than 150 kg surface additive per hectare. In yet another embodiment, the aqueous mixture containing the surface additive is sprayed onto a target area of soil at a rate of, or at a rate equivalent to, less than about 125 kg surface additive per hectare. In another embodiment, the aqueous mixture containing the surface additive is sprayed onto a target area of soil at a rate of, or at a rate equivalent to, less than 100 kg surface additive per hectare. In further embodiments, the aqueous mixture containing the surface additive is sprayed onto a target area of soil at a rate of, or at a rate equivalent to, less than 90 kg surface additive per hectare. In yet further embodiments, the aqueous mixture containing the surface additive is sprayed onto a target area of soil at a rate of, or at a rate equivalent to, less than 85 kg surface additive per hectare, less than 75 kg surface additive per hectare, less than 50 kg surface additive per hectare, less than 35 kg surface additive per hectare, less than 25 kg surface additive per hectare or less than 20 kg surface additive per hectare. In some embodiments, the aqueous mixture containing the surface additive is sprayed onto a target area of soil at a rate of, or at a rate equivalent to, less than 15 kg surface additive per hectare. In other embodiments, the aqueous mixture is sprayed onto the soil at a rate of, or at a rate equivalent to, less than 10 kg surface additive per hectare.

In one embodiment, the surface additive is selected from polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, guar, unwashed guar gum, washed guar gum, cationic guar, carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar), guar hydroxypropyl trimonium chloride, hydroxypropyl guar hydroxypropyl trimonium chloride, starch, corn, wheat, rice, potato, tapioca, waxy maize, *sorghum*, waxy sarghum, sago, dextrin, chitin, chitosan, alginate compositions, xanthan gum, carageenan gum, *cassia* gum, tamarind gum, cationic cellulose, cationic polycarylamide, cationic starch, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing or a combination of any of the foregoing.

In one embodiment, the surface additive is selected from the group consisting of guar, hydroxypropyl guar gum, carboxymethyl guar gum, carboxymethylhydroxypropyl guar gum, and a combination of any of the foregoing. In another embodiment, the surface additive is selected from guar hydroxypropyl trimonium chloride, hydroxypropyl guar hydroxypropyl trimonium chloride or a combination of both.

The bulk additive and/or surface additive can be in an aqueous mixture, or in a dry or semi-dry form as, for example, granules. It is understood that semi-dry means that the bulk additives contains less than 15% moisture or water, while in some embodiments semi-dry means that the bulk additives contains less than 10% moisture or water, while in other embodiments the bulk additives contains less than 8% moisture or water (or solvent), while in further embodiments the bulk additives contains less than 5% moisture or water, while in still other embodiments the bulk additives contains less than 3% moisture or water, yet in other embodiments the bulk additives contains less than 2% moisture or water, while in yet other further embodiments the bulk additives contains less than 1% moisture or water, while in alternative embodiments the bulk additives contains less than 0.5% moisture or water, while in other embodiments the bulk additives contains less than 0.1% moisture or water.

In one embodiment, the bulk additive is selected from the group consisting of guar gum, derivatized guar gum including but not limited to cationic guar gum, polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, a derivative of any of the foregoing and a combination of any of the foregoing. Typically, the bulk additive is poly(acrylic acid).

In another aspect, surface additive or bulk additive is a polymer according to formula:

wherein n is an integer of from 1 to 1000; wherein $R_1$ comprises one or multiple phosphonate groups, silicate groups, siloxane groups, phosphate groups, phosphinate groups or any combination thereof; $R_2$-$R_3$ can individually be hydrogen, or a branched, linear or cyclic $C_1$-$C_6$ hydrocarbon with or without heteroatom; $M^+$ can be any suitable counterion or a hydrogen; wherein "D" is absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In another embodiment, n is an integer of from 1 to 5000. In another embodiment, n is an integer of from 1 to 1000. In yet another embodiment, n is an integer of from 10 to 3000. In a further embodiment, n is an integer of from 40 to 750.

DETAILED DESCRIPTION OF INVENTION

Figure 1:
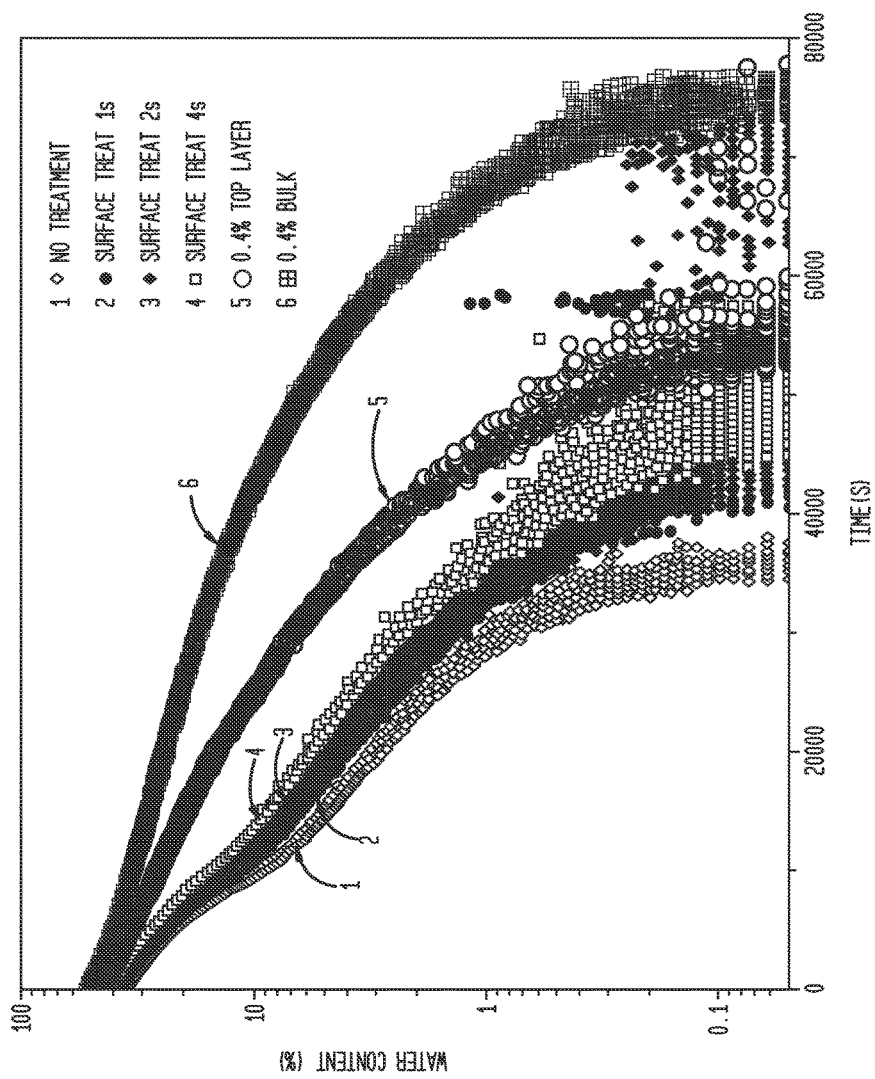
FIG. 1 is a graph illustrating surface treatment by spraying of the aqueous mixture of the surface additive.

The present invention relates to additives that are useful to improve germination rates of plants and crops comprising contacting, prior to or during water-stressed conditions, a top layer of a target soil area with a surface additive, whereby the surface additive forms a layer on the target soil area. The present invention relates to additives that are used to limit the loss of water by evaporation (i.e., evaporation control). Many of the known methods and additives to control water loss differ from the invention claimed herein in that their main focus is on limiting the water loss by drainage (i.e., drainage control).

However, such methods are fundamentally different than that of the methods described herein, as the mechanisms to avoid the water loss are different in these cases. It is understood, however, that controlling water loss (and thus increasing plant/crop yield in a targeted soil) though a combination of evaporation control and drainage control can be utilized.

Water loss can be attributable to transpiration, evaporation or runoff through drainage channels in the soil. Many of the known methods that prevent water loss through drainage are correlated to the nature of the targeted soils and well as local climate conditions. For example, arable and cultivable lands in the United States are predominately of the sandy type. However, in China and South East Asia, lands are mostly of the clay type. Clay soils in general have a different soil structure than sandy soils as the average particle size of clay soils, and thus pore size, is smaller. Generally, clay soils have a mean particle diameter ($D_{50}$) of less than 50 micrometers. Typically, clay soils have a mean particle diameter ($D_{50}$) of about or less than 25 micrometers. More typically, clay soils have a mean particle diameter of about or less than 5 micrometers. On the contrary, sandy soil is generally characterized by round grains with particle sizes ranging from 100 micrometers to 2000 micrometers. There are other differences between sandy, clay, as well as other types of soils, as generally described below.

Sandy Soils: Generally, sandy soils have a gritty texture and are formed from weathered rocks such as limestone, quartz, granite, and shale. Sandy soils can contain sufficient to substantial organic matter, which makes it relatively easy to cultivate. Sandy soils, however, are prone to over-draining and dehydration, and can have problems retaining moisture and nutrients.

Silty Soil: Generally, silty soil is considered to be among the more fertile of soils. Silty soil is generally composed of minerals (predominantly quartz) and fine organic particles, and it has more nutrients than sandy soil offers good drainage. When dry it has rather a smooth texture and looks like dark sand. Its weak soil structure means that it is easy to work with when moist and it holds moisture well.

Clay (or Clayey) Soil: When clay soils are wet they are generally sticky, lumpy and pliable but when they dry they generally form hard clots. Clay soils are composed of very fine particles with few air spaces, thus they are hard to work and often drain poorly—they are also prone to water logging in spring. Blue or grey clays have poor aeration and must be loosened in order to support healthy growth. Red color in clay soil indicates good aeration and a "loose" soil that drains well. As clay contains high nutrient levels plants grow well if drainage is adequate.

Peaty Soil: Peaty soil generally contains more organic material than other soils because its acidity inhibits the process of decomposition. This type of soils contains fewer nutrients than many other soils and is prone to over-retaining water.

Loamy Soil: Generally, loamy soils are a combination of roughly 40% sand, 40% silt and 20% clay. Loamy soils can range from easily workable fertile soils full of organic matter, to densely packed sod. Generally, they drain yet retain moisture and are nutrient rich.

Chalky Soil: Chalky soils are generally alkaline and may contain a variety of different sized stones. These types of soil can dry out quickly and have a tendency to block trace elements such as iron and manganese. This can cause poor growth and yellowing of leaves, as the nutrients are generally not available to the plants. Chalky soil is generally regarded as poor quality, needing substantial addition of fertilizers and other soil improvers.

As the pore size, or distance between two adjacent particles is smaller in, for example, clay soils compared with sandy soils, the loss of water by drainage is less of a concern. In clay soils, loss of water by runoff or, in particular, evaporation is more of a concern, as some crops are adapted to be grown in water beds. This difference in the soil-type (e.g., clay vs. sandy) is the primary reason why in many Asian countries, e.g., South China and South East Asian countries, it is possible to cultivate rice, which is grown in beds of water.

Generally, soils that are only slightly permeable or moderately permeable to water are required for harvesting such water tolerant crops, including rice. The soil-types necessary to grow rice or water-tolerant plants are the types that naturally block drainage of water, i.e., minimal water loss by drainage. Rice, however, is not feasible in North America because as explained above, the soil type is sandy and not clay. Thus, to the contrary of US and North America type-soils, the limitation of loss of water by evaporation is the main concern in clay soils as can be found, for example, in many parts of Asia. (In the US and North America, the loss of water through drainage or runoff is more of a concern than loss of evaporation) It is understood, however, that loss by evaporation is not only limited to clay soils but to other soil-types as well, especially when considering all factors such as local climate, altitude, humidity, as well as soil type and the layering of different soil types that can affect the predominant type of water loss. Other soil-types thus can have issues with evaporation and include but are not limited to sandy soils, peaty soils, silty soils, chalky soils, loamy soils or any combination.

Described herein are one or more methods of contacting or mixing different additives onto and/or into soils typically in order to slow down the water evaporation kinetics of the target soil area (i.e., an area of soil where user desires to apply the application/system/methods described herein). Different types of soils can be targeted, including but not limited to clay soils, sandy soils, peaty soils, silty soils, chalky soils, and loamy soils, in which there is a desire to slow down evaporation kinetics. As will become apparent from the following detailed description, some embodiments comprise methods utilizing soil additives that are easy to synthesize and in some embodiments, resist degradation or are otherwise highly stabilized.

One embodiment comprises two application treatments in or onto the soil, one being a surface treatment which utilizes a surface additive, the other being a bulk treatment which utilizes a bulk additive. In one embodiment, both the surface treatment and bulk treatment are applied to the target soil area, either concurrently or in sequence with one another. In some cases, the bulk and surface treatment approach is capable of slowing down up to 30% the evaporation kinetics.

One embodiment, the application comprises solely the surface treatment to the target soil area. In yet another embodiment, the application comprises solely the bulk treatment to the target soil area.

Surface treatment: The surface additives are contacted or applied to the soil surface and create a layer that reduces the water loss from evaporation. The layer, in some embodiments, can be a semi-permeable layer. Typically, the way of contacting the surface additive to the soil surface is to spray an aqueous solution onto the soil surface. Without being bound by theory, this layer can be viewed as a "crust" that can sufficiently or substantially plug the pores of the soil in the vicinity of the surface of the target soil area. Thus, the evaporation kinetics are impacted by the additive layer on the top surface of the soil.

In one embodiment, the surface treatments described herein improve the germination rate of a plant or crop through contacting a surface additive to a top layer of a target soil area. In some embodiments, the surface treatments described herein improve the germination rate of a plant or crop during water stressed conditions through contacting, prior to or during such water-stressed conditions, a surface additive to a top layer of a target soil area. Thus, the surface additive forms a layer on the target soil area. The layer can, in some embodiments, be permeable, semi-permeable. Method described can further include contacting a seed into or within the target soil area. In one embodiment, the seed is positioned at a depth of less than 1 mm from the soil surface. In another embodiment, the seed is positioned at a depth of less than 2 mm from the soil surface. In another embodiment, the seed is positioned at a depth of less than 4 mm from the soil surface. In yet another embodiment, the seed is positioned at a depth of less than 5 mm from the soil surface. In yet another embodiment, the seed is positioned at a depth of less than 7 mm from the soil surface.

The seed can be any useful or known plant or crop seed. In one embodiment, the seed used in the methods described herein fall into one of three categories: (1) ornamental (such as roses, tulips, etc.), grasses and non-crop seed; (2) broad crop and cereal seeds and (3) horticulture and vegetable seeds. In one particular embodiment, the crop seed is selected from the seed of the species or subspecies *Brassica rapa, Brassica chinensis* and *Brassica pekinensis*.

In one embodiment, the seed is of the crop or plant species including but not limited to corn (*Zea mays*), *Brassica* sp. (e.g., *B. napus, B. rapa, B. juncea*), alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Cofea* spp.), coconut (*Cocos nucifera*), pineapple (*Ananas comosus*), citrus trees (Citrus spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, vegetables, ornamentals, woody plants such as conifers and deciduous trees, squash, pumpkin, hemp, zucchini, apple, pear, quince, melon, plum, cherry, peach, nectarine, apricot, strawberry, grape, raspberry, blackberry, soybean, *sorghum*, sugarcane, rapeseed, clover, carrot, and *Arabidopsis thaliana*.

In one embodiment, the seed is of any vegetables species including but not limited to tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), cauliflower, broccoli, turnip, radish, spinach, asparagus, onion, garlic, pepper, celery, and members of the genus *Cucumis* such as cucumber (*C. sativus*), cantaloupe (*C. cantalupensis*), and musk melon (*C. melo*).

In one embodiment, the seed is of any ornamentals species including but not limited to hydrangea (*Macrophylla hydrangea*), hibiscus (*Hibiscus rosasanensis*), petunias (*Petunia hybrida*), roses (Rosa spp.), azalea (*Rhododendron* spp.), tulips (*Tulipa* spp.), daffodils (*Narcissus* spp.), carnation (*Dianthus caryophyllus*), poinsettia (*Euphorbia pulcherrima*), and *chrysanthemum*.

In one embodiment, the seed is of any conifer species including but not limited to conifers pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

In one embodiment, the seed is of any leguminous plant species including but not limited beans and peas. Beans include guar, locust bean, fenugreek, soybean, garden beans, cowpea, mungbean, lima bean, fava bean, lentils, chickpea, pea, moth bean, broad bean, kidney bean, lentil, dry bean, etc. Legumes include, but are not limited to, *Arachis*, e.g., peanuts, *Vicia*, e.g., crown vetch, hairy vetch, adzuki bean, mung bean, and chickpea, *Lupinus*, e.g., lupine, *trifolium, Phaseolus*, e.g., common bean and lima bean, *Pisum*, e.g., field bean, Melilotus, e.g., clover, *Medicago*, e.g., alfalfa, Lotus, e.g., trefoil, lens, e.g., lentil, and false indigo. Typical forage and turf grass for use in the methods described herein include but are not limited to alfalfa, orchard grass, tall fescue, perennial ryegrass, creeping bent grass, lucerne, birdsfoot trefoil, clover, stylosanthes species, lotononis bainessii, sainfoin and redtop. Other grass species include barley, wheat, oat, rye, orchard grass, guinea grass, *sorghum* or turf grass plant.

In another embodiment, the seed is selected from the following crops or vegetables: corn, wheat, *sorghum*, soybean, tomato, cauliflower, radish, cabbage, canola, lettuce, rye grass, grass, rice, cotton, sunflower and the like.

Water-stressed conditions means that the target soil area is watered with less than 2.6 mm (10 ml) of water over at least a 2 day period in some embodiments, over at least a 3 day period in other embodiments, over at least a 4 day period in other embodiments, over at least a 5 day period in other embodiments, over at least a 7 day period in other embodiments, over at least a 9 day period in other embodiments, over at least a 10 day period in further embodiments, or over at least a 20 day period in further embodiments. Water-stressed conditions can also mean that the target soil area is watered through irrigation or natural rainfall (or a combination of both) over a period of 30 calendar days with less than 52 mm of water in one embodiment, with less than 47 mm of water in another embodiment, with less than 42 mm of water in another embodiment, with less than 37 mm of water in yet another embodiment, with less than 32 mm of water in another embodiment, with less than 27 mm of water in yet another embodiment, with less than 22 mm of water in another embodiment, with less than 11 mm of water in another embodiment, with less than 7 mm of water in another embodiment or with less than 3 mm of water in yet another embodiment.

Bulk treatment: The additives are introduced in the soil volume. In one embodiment, the soil and the additives are jointly mixed in bulk and the additives block the water from migrating towards the soil surface to be susceptible to evaporation. In other words, instead of losing water by drainage in the downward direction by plugging the pores of the soil, the bulk treatment approach blocks the water transport in the upwards direction. The bulk additives can also retain water which allows for later utilization by vegetation as water is pulled away from additives via pressure gradient, capillary flow, etc. Further, without being bound by theory, in some embodiments, the bulk additive (e.g., cationic guar) can break capillary bridges in the soil and thus prevent the moisture or water from migrating to the surface of the soil.

Delivery of Soil Additives onto or into Soils

There are several ways in which to apply the soil additives (e.g., the bulk additive or the surface additive) to the soil.

Typically, the bulk additive is applied to or mixed into the soil in a granular form. This is typically done before planting the desired crop, shrub, plant, grass seed or other foliage though tilling or other methods generally known in the art. In some embodiments, however, the bulk additive is applied concurrently with the planting of the crop, grass seed, or other foliage. In other embodiments, the bulk additive is applied after the planting of the crop, grass seed, shrub, other foliage, which for example could be 1 day after planting, 1 week or 1 month after planting, or until up to 7 months after planting. It is understood that the bulk additive can be applied (by itself of in connection with the surface additive) to the plant, shrub grass or ground at different stages of the plant growth or life cycle, and is not necessarily limited to prior implantation or at any one given stage of plant growth. This allows for a user of the claimed invention to have flexibility in when applying the bulk additive, which may depend on external factors such as, for example, drought and other weather conditions.

In some embodiments, the bulk additive is applied to or mixed into the soil as an aqueous mixture, where the additive is diluted in water or in an aqueous solution containing other ingredients. For example, in one embodiment, the bulk additive is introduced into irrigation water that is applied to the target soil area, or crops. Typically, the bulk additive is diluted with a significant amount of water or sufficiently crosslinked, such that gelling does not occur. Typically, such flowable bulk additive aqueous mixtures have a viscosity ranging from between 1 and 200,000 centipoise.

In other embodiments, the bulk additive is applied to or mixed into the soil next to existing vegetation. It is understood that various methods for applying the soil additives can be utilized. Some methods include but are not limited to: creating a hole in the soil with pressurized water then introducing the soil additive into the hole with pressurized air; removing small plugs from the soil (e.g., aeration of golf greens) and introducing the soil additive into the hole. Other methods include cutting and temporarily uprooting sections of vegetation and blowing or otherwise applying the soil additive to the soil underneath the vegetation, such as sod.

Yet other methods also include mixing by applying the soil additive on the surface of the target soil area and then mixing or homogenously mixing the target soil area, which includes the surface of the target soil area to which the soil additive is introduced. For example, in some embodiments the target soil area can include an area of land, e.g., 1 hectare of agriculturally viable land, but also can comprise a predetermined depth. In some embodiments, the predetermined depth that is included in the target soil area can be less than 3 ft of depth of soil, in another embodiment less than 2 ft of depth of soil, in another embodiment less than 18 inches of depth of soil, in another embodiment less than 16 inches of depth of soil, in another embodiment less than 12 inches of depth of soil, in another embodiment less than 9 inches of depth of soil, in another embodiment less than 7 inches of depth of soil, in another embodiment less than 5 inches of depth of soil, in another embodiment less than 3 inches of depth of soil, in another embodiment less than 2 inches of depth of soil, or in yet another embodiment less than 1 inch of depth of soil.

Mixing can be accomplished in several ways and can include utilizing a plow or till. (It is understood that some tillers are equipped with a system that allows subsoil injection of additives (mainly fertilizers) through a hole.) Tilling techniques that can be applied to any of the embodiments of the invention as claimed include but are not limited to strip-tilling, mulch-tilling and ridge-tilling, and can be used in primary tillage or secondary tillage. Such tilling techniques can be implemented by an using one or any combination of equipment including but not limited to hoe, shovel, plough, harrow, disk plough, dibble, rotary tillers, subsoiler, ridge or bed forming tillers, or roller.

Yet another method of applying the soil additives to the target soil area is through casting or spraying. Some techniques may be similar to fertilizer application techniques, which include but are not limited to broadcasting (distribution over a majority or part of a cropped field), placement (application in bands or in pockets near the plants or plant rows) as well as application using low or high volume sprayers. In some of the embodiments referenced above, it is believed that the bulk additives migrate (typically, in most embodiments, remaining in the root zone) below the surface of the target soil area by being transported via water flow through, for example, rainfall or irrigation.

Another method includes pre-mixing the bulk additive with soil and then applying the mixture to the surface of the target soil area. In one embodiment, the pre-mixed soil forms a layer or sufficiently even layer over the targeted soil area of at least 1 inch, or in other embodiments at least 2 inches, or in other embodiments at least 3 inches, or in other embodiments at least 4 inches, or in other embodiments at least 6 inches, or in other embodiments at least 8 inches. This method is similar to "mulching" techniques wherein a mixture is placed over a bed, i.e., a target area, of soil in an even or somewhat consistent layer.

In a further embodiment, the bulk additive is applied to or mixed with a targeted soil area at a predetermined depth forming a "bulk additive layer." The bulk additive layer can be, in some embodiments, at least a 1 inch layer, or in other embodiments at least a 2 inch layer, or in other embodiments at least a 3 inch layer, or in other embodiments at least a 4 inch layer, or in other embodiments at least a 6 inch layer, or in other embodiments at least a 8 inch layer. After the bulk additive is applied to or mixed with a targeted soil area, the "bulk additive layer" area is covered with a layer of untreated soil, or soil without the bulk additive, to form a free layer. It is believed, in such embodiments, without being bound by theory, the bulk additive through the bulk additive layer can break capillary bridges in the soil and thus prevent the moisture or water from migrating to the surface of the soil, or to the free layer, from layers at or below the bulk additive layers, because of such disruption or breaking of the capillary bridge.

In another embodiment, the bulk additive layer is created by sub surface injection of the bulk additive to the bulk additive layer, such that there is a free layer above such bulk additive layer. In this way, the free layer does not have to be foreign or displaced soil that covers the bulk additive layer. Instead, the free layer is untreated soil already present in the targeted area.

In yet another embodiment, the bulk additive encapsulates all or a portion of a seed that is planted, or alternatively the bulk additive encapsulates all or a portion of a fertilizer or fertilizer granule.

While not being bound by theory, it is believed that there are at least two factors that explain the increase of the evaporation time when the bulk additives are introduced to the soil (e.g., Underivatized guar, PAANa, starch): 1) initial water absorption and 2) evaporation kinetics.

Initial Water Absorption:

The bulk additives help to absorb and retain more water in the soil as compared to the untreated soil without additive. Additives act as sponges as they can hydrate, swell and prevent water from draining.

Evaporation Kinetics:

It is believed that a second factor relating to the increase of the evaporation time of soils is due to the change of the internal structure of the soils, wherein the moisture in the soil is wicked or pulled to the surface (i.e., evaporation front) and becomes lost to evaporation. Additives can clog some of the pores in the soil, and therefore can slow down the water transport towards the evaporation front.

In some embodiments, the surface additives are applied to the targeted soil area in flowable form. Typically, the surface additives are dispersed in water at a concentration of less than 5 wt % (weight percent). In some embodiments, the surface additives are dispersed in water at a concentration of less than 2 wt %. In some embodiments, the surface additives are dispersed in water at a concentration of less than 1 wt %. In some embodiments, the surface additives are dispersed in water at a concentration of less than 0.5 wt %. In some embodiments, the surface additives are dispersed in water at a concentration of less than 0.4 wt %. In some embodiments, the surface additives are dispersed in water at a concentration of less than 0.3 wt %. In other embodiments, the surface additives are dispersed in water at a concentration of less than 0.1 wt %. The aqueous mixture of surface additive is generally sprayed onto the target soil area. Irrigation pumps, spray booms and the like may be used, but any method generally known for applying a liquid or spray onto agricultural land may be employed. In some embodiments, the aqueous mixture is applied for a time of about 4 seconds to the targeted soil area (4 s for 0.4% equals to 65 kg/ha). In some embodiments, the aqueous mixture is applied for a time of equal to or less than 10 seconds to the targeted soil area. In other embodiments, the aqueous mixture is applied for a time of equal to or less than 2 seconds to the targeted soil area.

In some embodiments, an aqueous mixture containing the surface additive is sprayed onto a target area of soil at a rate of or at a rate equivalent to less than 150 kg surface additive per hectare. In yet another embodiment, the aqueous mixture containing the surface additive is sprayed onto a target area of soil at a rate of, or at a rate equivalent to, less than about 125 kg surface additive per hectare. In another embodiment, the aqueous mixture containing the surface additive is sprayed onto a target area of soil at a rate of, or at a rate equivalent to, less than 100 kg surface additive per hectare. In further embodiments, the aqueous mixture containing the surface additive is sprayed onto a target area of soil at a rate of, or at a rate equivalent to, less than 90 kg surface additive per hectare. In yet further embodiments, the aqueous mixture containing the surface additive is sprayed onto a target area of soil at a rate of, or at a rate equivalent to, less than 85 kg surface additive per hectare, less than 75 kg surface additive per hectare, less than 50 kg surface additive per hectare, less than 35 kg surface additive per hectare, less than 25 kg surface additive per hectare or less than 20 kg surface additive per hectare. In some embodiments, the aqueous mixture containing the surface additive is sprayed onto a target area of soil at a rate of, or at a rate equivalent to, less than 15 kg surface additive per hectare. In other embodiments, the aqueous mixture is sprayed onto the soil at a rate of, or at a rate equivalent to, less than 10 kg surface additive per hectare. In some embodiments, the aqueous mixture comprising a surface additive can contain other ingredients.

It is understood that similar to the bulk additive the surface additive can be applied (by itself of in connection with the bulk additive) to the plant, shrub grass or ground at different stages of plant growth. This allows for a user to have flexibility in when applying the surface additive, the desirability of which can depend on external factors such as, for example, drought and other weather conditions.

Compounds suitable as additional ingredients of the aqueous mixture can include compounds used to control agricultural pests and include, for example, herbicides, plant growth regulators, crop dessicants, fungicides, bacteriocides, bacteriostats, insecticides, and insect repellants. Suitable pesticides include, for example, triazine herbicides; sulfonylurea herbicides; uracils; urea herbicides; acetanilide herbicides; and organophosphonate herbicides such as glyphosate salts and esters. Suitable fungicides include, for example, nitrilo oxime fungicides; imidazole fungicides; triazole fungicides; sulfenamide fungicides; dithio-carbamate fungicides; chloronated aromatic; and dichloro aniline fungicides. Suitable insecticides, include, for example, carbamate insecticides; organo thiophosphate insecticides; and perchlorinated organic insecticides such as methoxychlor. Suitable miticides include, for example, propynyl sulfite; triazapentadiene miticides; chlorinated aromatic miticides such as tetradifan; and dinitrophenol miticides such as binapacryl. Other ingredients can comprise adjuvants, surfactants and fertilizers.

Soil Additives: Synthetic Polymers, Natural Polymers

In one embodiment, the bulk additives and/or surface additives comprise one or more synthetic polymers, natural polymers or derivatives thereof. Such polymers are not particularly limited and can be homopolymers, as well as random or block or any other types of copolymers made from any polymerizable monomer.

In one embodiment, the polymerizable monomers are typically water-soluble chargeable monomers having carboxylic groups, sulfonate groups, phosphonate groups and the like. In one embodiment, the polymerizable monomers having one or more carboxylic groups include but are not limited to acrylic acid, methacrylic acid, crotonic acid, sorbic acid, maleic acid, itaconic acid, cinnamic acid, its salt or the like, or an anhydride thereof (maleic anhydride or the like). The counterion of such polymerizable monomer salts include any suitable counterion including but not limited to alkyl ammonium, sodium, calcium, potassium, barium, lithium, magnesium, ammonium cation, and the like.

The polymerizable monomers include also neutral, typically water-soluble monomers or monomers, such as radically polymerizable acrylates, methacrylates, acrylamides, methacrylamides, vinyl alcohol, allyl alcohols, vinyl acetates, betaine-containing vinyl monomers (including but not limited to carboxyl betaines and sulfobetaines), and other ethylenically unsaturated monomers. The polymers can also include component polymers from other polymerization techniques such as condensation, anionic polymerization, cationic polymerization, ring opening polymerization, coordination polymerization, metathesis polymerization, etc., as exemplified by poly(alkylene oxides) (including but not limited to poly(ethylene glycol), poly(propylene glycol), and polytetrahydrofuran), polyglycerol, polyamine, polyester, polyamide, derivatives of any of the foregoing and/or copolymers of any of the foregoing. Met(acrylamido) family: as MAPTAC (MethacrylamidoPropylTrimethylAmmonium chloride, Allyl family as DADMAC (DiAllylDimethylAmmonium Chloride), Vinyl family: N-Vinylformamide (vinyl amine precursor) or VinylBenzene Trimethyl ammonium chloride, Met(acrylate) family: as Trimethylammonium ethyl metacrylate chloride.

In one exemplary embodiment, the synthetic polymers include but are not limited to polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran and polyamide. The phosphonate end-capped polymers, for example, can be any of the herein described polymers or copolymers containing a phosphonate or phosphate terminating end-group or end-groups.

In another embodiment, the surface additive or bulk additive is a polymer according to formula:

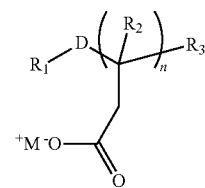

wherein n is an integer of from 1 to 1000; wherein $R_1$ comprises one or multiple phosphonate groups, silicate groups, siloxane groups, phosphate groups, phosphinate groups or any combination thereof; $R_2$-$R_3$ can individually be hydrogen, or a branched, linear or cyclic $C_1$-$C_6$ hydrocarbon with or without heteroatom; $M^+$ can be any suitable counterion or a hydrogen; wherein "D" is absent or represent a linear or branched $C_1$-$C_5$ hydrocarbon group, a $C_1$-$C_5$ alkoxy group, oxy group (—O—), iminyl (—NH—), or substituted iminyl (—NR—), wherein R a $C_1$-$C_6$ alkyl, a $C_1$-$C_6$ alkoxyl, a $C_1$-$C_6$ hydroxylalkyl, a $C_1$-$C_6$ alkoxyalkyl or a $C_1$-$C_6$ alkylalkoxyl. In another embodiment, n is an integer of from 1 to 5000. In another embodiment, n is an integer of from 1 to 1000. In yet another embodiment, n is an integer of from 10 to 3000. In a further embodiment, n is an integer of from 40 to 750.

The surface additive and/or bulk additive can be any suitable polysaccharide including but are not limited to galactomannan polymers, guar gum (washed or unwashed), derivatized guar, starch, dextrins, chitin/chitosan, alginate compositions, *cassia* gum, tara gum, xanthan gum, locust beam gum, carrageenan gum, gum karaya, gum arabic, hyaluronic acids, succinoglycan, pectin, crystalline polysaccharides, branched polysaccharide, cellulose, as well as other derivatives thereof such as ionic and/or non-ionic derivatives and other derivates of any of the foregoing.

In one embodiment, the derivatized guar can include but is not limited to cationic hydroxpropyl guar, hydroxyalkyl guar, including hydroxyethyl guar (HE guar), hydroxypropyl guar (HP guar), hydroxybutyl guar (HB guar) and higher hydroxylalkyl guars, carboxylalkyl guars, including carboxymethyl guar (CM guar), carboxylpropyl guar (CP guar), carboxybutyl guar (CB guar), and higher alkyl carboxy guars, guar hydroxypropyltrimonium chloride, or hydroxypropyl guar hydroxypropyltrimonium chloride. For example, the Jaguar HP is a hydroxypropyl guar.

Cationisation can be achieved:
1) by polymerization of monomers cited above and direct grafting on the polysaccharide chain. As PQ4=Hydroxyethyl cellulose grafted with Poly(DAD-MAC)
2) by grafting one of the above cited monomers through Michael reaction 3) by grafting of reagents known by the skilled scientists: halides (Quat188, quab342), epoxides (quab151), acid chlorides, carboxylic acics, or ester or anhydrides, amines each of those having a reactive group towards polysaccharide and a cationic group (trialkyl ammonium as trimethyl ammonium)

In one particular embodiment, derivatized guars include but are not limited to carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar) and hydrophobically modified cationic guar (HM cationic guar).

In the case of hydrophobic or nonhydrophobic modified cationic guars, the cationic group is a quaternary ammonium group bearing three radicals, which may be identical or different, chosen from hydrogen, an alkyl radical containing 1 to 22 carbon atoms, more particularly 1 to 14 and advantageously 1 to 3 carbon atoms. The counterion is a halogen, which is one embodiment is chlorine.

In the case of cationic polysaccharide (e.g., guar) derivatives, the degree of hydroxyalkylation (molar substitution or MS) is between 0 and 1.2 in one embodiment, is between 0 and 1.7 in another embodiment, is between 0 and 2 in another embodiment, or is between 0 and 3 in another embodiment. The degree of substitution (DS) is in one embodiment between 0 and 3, typically between 0 and 2, more typically between 0.01 and 1, even more typically between 0.01 and 0.6.

Among the cationic guar derivatives that may be specifically mentioned are: Agrho ExPol 2 (guar hydroxypropyl trimonium chloride, DS=0.05-0.15, weight average molecular weight (Mw) of 1 million to 2 million); Agrho ExPol 3 (guar hydroxypropyl trimonium chloride, DS=0.05-0.15, weight average molecular weight (Mw) of 100,000 to 500,000); and Agrho ExPol 1 (hydroxypropyl guar hydroxypropyl trimonium chloride, DS=0.05-0.15, MS=0.4-0.8, weight average molecular weight (Mw) of 1 million to 2 million). In one embodiment, typical polysaccharides used are cationic guar or hydroxypropylated cationic guar powders.

Examples of suitable cellulose include but are not limited to hydroxycelluloses, hydroxyalkyl cellulose, including hydroxyethyl cellulose, carboxymethylhydroxyethyl cellulose, hydroxypropyl cellulose, carboxymethylcellulose, cellulose ethers and other modified celluloses.

In one particular embodiment, cellulose ethers include hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CM H EC), hydroxypropylhydroxyethyl cellulose (HPHEC), methyl cellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HM-HPHEC), hydrophobically modified methyl cellulose (H MMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC). Preferred cellulose ethers are carboxymethyl cellulose and hydroxyethyl cellulose and cationic hydroxyethyl cellulose.

In the case of hydrophobic or nonhydrophobic modified cationic celluloses, the cationic group is a quaternary ammonium group bearing three radicals, which may be identical or different, chosen from hydrogen and an alkyl radical containing 1 to 10 carbon atoms, more particular 1 to 6 and advantageously 1 to 3 carbon atoms. The counterion is a halogen, which in one embodiment is chlorine.

Examples of suitable starch sources include but are not limited to corn, wheat, rice, potato, tapioca, waxy maize, *sorghum*, waxy *sorghum*, sago and modified starches. Examples of modified starches include dextrinated, hydrolysed, oxidized, crosslinked, alkylated, hydroxyalkylated, acetylated, fractionated (e.g. amylose and amylopectin), and physically modified starches, including cationic starches, among others.

In one embodiment, the soil additive composition is comprised of any suitable natural polymer, synthetic polymer or combination thereof, as well as inorganic material, typically a porous inorganic material. Suitable inorganic materials include but are not limited to clays, diatoms, silicates, silica, carbonates, gypsum, and any combination thereof. Such inorganic materials may be porous or non-porous and, in one embodiment, are utilized to increase the efficacy of the bulk additive or surface additive.

In one embodiment, the bulk additive or surface additive is a polymer having a weight average molecular weight of between about 5,000 daltons and 500,000 daltons. In another embodiment, the soil additive is a polymer having a weight average molecular weight of between about 200,000 daltons and 1,000,000 daltons. In yet a further embodiment, the soil additive is a polymer having a weight average molecular weight of between about 500,000 daltons and 1,500,000 daltons. In another embodiment, the soil additive is a polymer having a weight average molecular weight of between about 800,000 daltons and 2,000,000 daltons. In another embodiment, the soil additive is a polymer having a weight average molecular weight of up to about 5,000,000 daltons. In another embodiment, the soil additive is a polymer having a weight average molecular weight of up to about 25,000,000 daltons. In a further embodiment, the soil additive is a polymer having a weight average molecular weight of up to about 50,000,000 daltons. In one particular embodiment, the surface additives described herein have a weight average molecular weight of less than about 1,000,000 daltons. In another particular embodiment, the surface additives described herein have a weight average molecular weight of between about 1,200,000 daltons and 1,900,000 daltons.

The polymers may also be cross-linked or non-cross-linked, or to some degree a combination of both. The crosslinking agents utilized can include but are not limited to copper compounds, magnesium compounds, borax, glyoxal, zirconium compounds, titanium compounds (for example, titanium IV compounds such as titanium lactate, titanium malate, titanium citrate, titanium ammonium lactate, polyhydroxy complexes of titanium, titanium triethanolamine, and titanium acetylacetonate), calcium compounds, aluminum compounds (such as, for example, aluminum lactate or aluminum citrate), p-benzoquinone, dicarboxylic acids and their salts, phosphite compounds and phosphate compounds. In another embodiment, the cross-linking agent is a chemical compound containing a polyvalent ion such as, but not necessarily limited to, boron or a metal such as chromium, iron, aluminum, titanium, antimony and zirconium, or mixtures of polyvalent ions.

Surface or Bulk Additive as a Surfactant

The surface additive and/or bulk additive, in some embodiment, can be a zwitterionic, anionic, nonionic, amphoteric or cationic surfactant. In one such embodiment, the surface additive or bulk additive is one or more cationic surfactants, which are ionic surfactant compounds that have a positive electrical charge associated with the hydrophilic portion of the surfactant. Suitable cationic surfactants can be chosen from primary, secondary or tertiary, optionally polyethoxylated fatty amine salts, quaternary ammonium salts such as tetraalkylammonium, alkylamidoalkylammonium, trialkylbenzylammonium, trialkylhydroxyalkylammonium or alkylpyridinium chlorides or bromides, imidazoline derivatives and amine oxides of cationic nature.

In another embodiment, examples of suitable cationic surfactants include compounds according to formula (I) below:

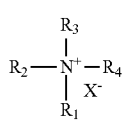

(I)

wherein:

$R_1$, $R_2$, $R_3$ and $R_4$, are each independently hydrogen, an organic group, a hydrocarbon group, provided that at least one of $R_1$, $R_2$, $R_3$ and $R_4$ is not hydrogen.

$X^-$ is an anion.

Suitable anions include, for example, chloride, bromide, methosulfate, ethosulfate, lactate, saccharinate, acetate or phosphate. If one to three of the $R_1$, $R_2$, $R_3$ and $R_4$ groups are hydrogen, then the compound may be referred to as an amine salt. Some examples of cationic amine salts include polyethoxylated (2) oleyl/stearyl amine, ethoxylated tallow amine, cocoalkylamine, oleylamine, and tallow alkyl amine.

For quaternary ammonium compounds, $R_1$, $R_2$, $R_3$, and $R_4$ may each independently be the same or different organic group, or alternatively, may be fused with another one of the $R_1$, $R_2$, $R_3$ and $R_4$ groups to form, together with the nitrogen atom to which they are attached, a heterocyclic ring, but may not be hydrogen. Suitable organic groups include, for example, alkyl, alkoxy, hydroxyalkyl, and aryl, each of which may be further substituted with other organic groups. Suitable quaternary ammonium compounds include monoalkyl amine derivatives, dialkyl amine derivatives, and imidazoline derivatives.

Suitable monoalkyl amine derivatives include, for example, cetyl trimethyl ammonium bromide (also known as CETAB or cetrimonium bromide), cetyl trimethyl ammonium chloride (also known as cetrimonium chloride), myristyl trimethyl ammonium bromide (also known as myrtrimonium bromide or Quaternium-13), stearyl dimethyl benzyl ammonium chloride (also known as stearalkonium chloride), oleyl dimethyl benzyl ammonium chloride, (also known as olealkonium chloride), lauryl/myristryl trimethyl ammonium methosulfate (also known as cocotrimonium methosulfate), cetyl-dimethyl-(2)hydroxyethyl ammonium dihydrogen phosphate (also known as hydroxyethyl cetyldimonium phosphate), bassuamidopropylkonium chloride, cocotrimonium chloride, distearyldimonium chloride, wheat germ-amidopropalkonium chloride, stearyl octyldimonium methosulfate, isostearaminopropal-konium chloride, dihydroxypropyl PEG-5 linoleaminium chloride, PEG-2 stearmonium chloride, Quaternium 18, Quaternium 80, Quaternium 82, Quaternium 84, behentrimonium chloride, dicetyl dimonium chloride, behentrimonium methosulfate, tallow trimonium chloride and behenamidopropyl ethyl dimonium ethosulfate.

Suitable dialkyl amine derivatives include, for example, distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, hydroxypropyl bisstearyldimonium chloride and mixtures thereof.

Suitable imidazoline derivatives include, for example, isostearyl benzylimidonium chloride, cocoyl benzyl hydroxyethyl imidazolinium chloride, cocoyl hydroxyethylimidazolinium PG-chloride phosphate, Quaternium 32, and stearyl hydroxyethylimidonium chloride, and mixtures thereof.

Method of Creating the Polymers

There are several production processes for making the polymers, i.e., the bulk and surface additives. Methods for making suitable synthetic polymer are documented in U.S. Pat. No. 5,202,400. Polymer can be made from radical polymerization, condensation, anionic polymerization, cationic polymerization, ring open polymerization, coordination polymerization, and metathesis polymerization, and the like. Examples of suitable radical polymerization processes include but are not limited to solution polymerization process, emulsion polymerization process, suspension polymerization process, reverse-phase suspension polymerization process, thin film polymerization process, and spray polymerization process, and the like. The particle size can be controlled by managing certain polymerization conditions and/or following by pulverization process. Methods for making suitable natural polymer derivatives are also generally known in the art. The cross-linking processes of polysaccharides are described in US Publication No. 20030027787 and U.S. Pat. No. 5,532,350.

EXAMPLES

Experiment—Effect of Surface and/or Bulk Additive

Generally, a soil sample is treated with a soil additive (bulk or surface treatment) and then is placed in a recipient (petri-dish or plastic pot) on top of a balance. In some cases, to speed up the evaporation process, the treated soil is exposed to a nearby fan and lamp (e.g., 100 W) to ensure a constant heated temperature on the soil surface of from about 30° C. to about 60° C. Typically, the soil surface is kept at a constant heated temperature of from about 35° C. to about 45° C. Weight loss over a certain period of time can be recorded by hand or automatically recorded with the aid of a computer.

The sample preparation for the bulk treatment is generally as follows:

1. introduce the bulk additive with the soil sample;
2. mix the treated soil sample by shaking or mixing (e.g., with a spoon);
3. transfer the treated soil sample to a tissue or semipermeable bag;

4. soak the tissue bag in a soaking dish for 30 minutes until about saturation;

5. remove the tissue bag from the soaking dish and allow excess water to drip out of the tissue bag; and 6. transfer the saturated treated soil sample from the tissue bag to the petri-dish and measure the water loss in function of time as explained above (evaporation rates are calculated from the water loss kinetic data).

The sample preparation for the surface treatment is generally as follows:

1. spray an aqueous mixture of the surface additive onto the soil sample, which is contained in a container having holes or perforation at or around the bottom portion, such that the surface additive forms a top layer;

2. place the bottom portion of the container in a soaking dish for about 30 minutes until about saturation;

3. remove the container from the soaking dish and allow excess water to drip out of the container; and 4. measure the water loss in function of time as explained above (evaporation rates are calculated from the water loss kinetic data).

An aqueous solution at 0.1 wt % was sprayed on the surface of a soil sample. When a real clay soil from Shaanxi Province (China) is sprayed for 4 seconds with an aqueous solution of Jaguar S (washed non modified guar gum, Rhodia Inc.) at 0.1 wt %, the water evaporation kinetics are slowed down by 30%. Referring to FIG. 1, the impact of the spraying time on the evaporation kinetics is illustrated. As shown in FIG. 1, the soil with no surface treatment showed shortest time period in which it retained water content relative to surface treated soil. The 0.4% bulk showed it retained water content the longest relative time.

Figure 2:
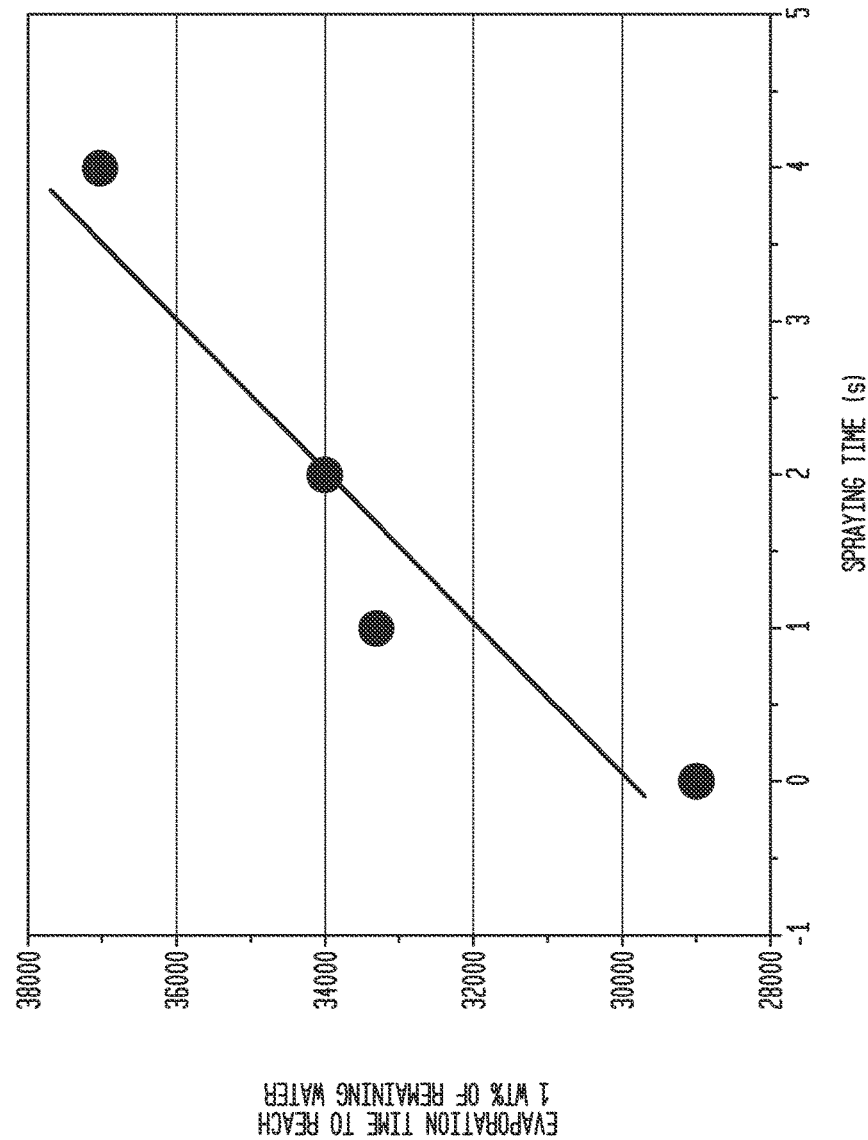
FIG. 2 is a graph showing the results of evaporation rate (time to reach 1 wt % of remaining water) as a function of spraying time (of a 0.1% solution of the surface additive).

It is desirable for the mixture to be applied by spray to land (before, during or after crop culture). In spray form, pesticides, fertilizers, other actives/adjuvants can be introduced and equally applied. A spraying time of 4 seconds is used, in one embodiment, as it is bringing the optimal efficiency in terms of water evaporation kinetics slow down. As can be seen from FIG. 2, a 30% of improvement is obtained when these conditions are applied to the soil (threshold: 1 wt % remaining water). If the evaporation time is measured at a threshold of 0.1 wt % remaining water, a 40% improvement is obtained. At the temperature and wind conditions in the laboratory (surface temperature=45° C., gentle wind circulation on the soil surface) the total water amount that is evaporated in a day is of 4.25 cm of water (overall evaporation rate 4.25 cm/day equivalent to very hot temperature condition regions). After the Jaguar S (0.1 wt %) solution application, the overall evaporation rate is of 3.35 cm/day (improvement of around 20%). The use in the surface additive (Jaguar S) per hectare (Ha) following the surface treatment application is about 50 Kg (cost about 50 USD/Ha) in-line with the agricultural and farming requirements.

With respect to bulk treatment of the soils with the bulk additives, the top 0-20 cm of soil are homogeneously mixed with one or more of the bulk additives. The application and mixture of the additive with the soil is in one embodiment to be performed by introducing the additive in solid form (powder or granules). The additive can be introduced before seeding the soils and/or can be jointly introduced with fertilizers and other actives. The typical concentrations of additives that could be introduced range in the $10^{-4}$ to 0.5 wt % interval.

Figure 3:
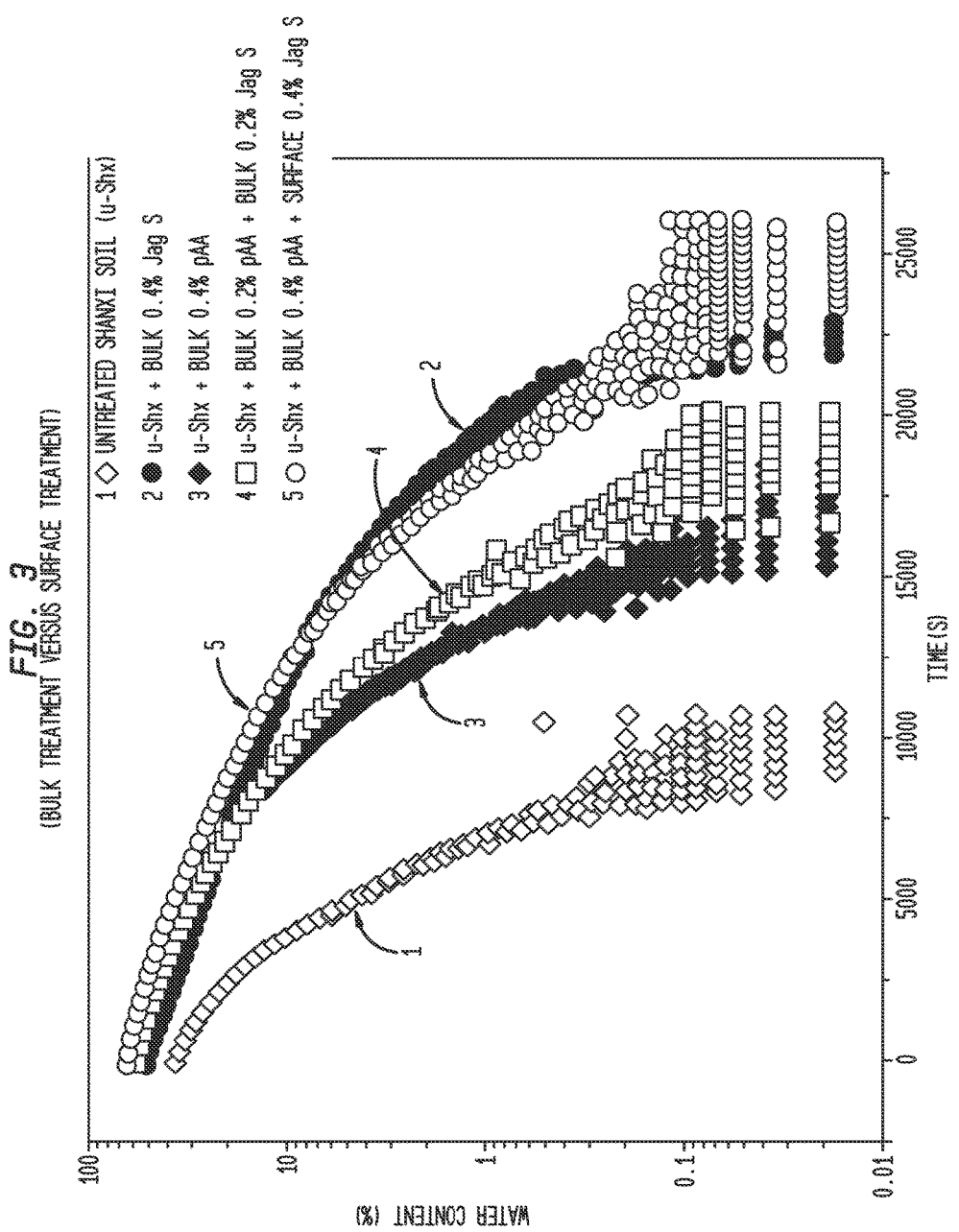
FIG. 3 is a graph illustrating the evaporation rate of respective bulk and surface additives as a function of water content (%).
Figure 4:
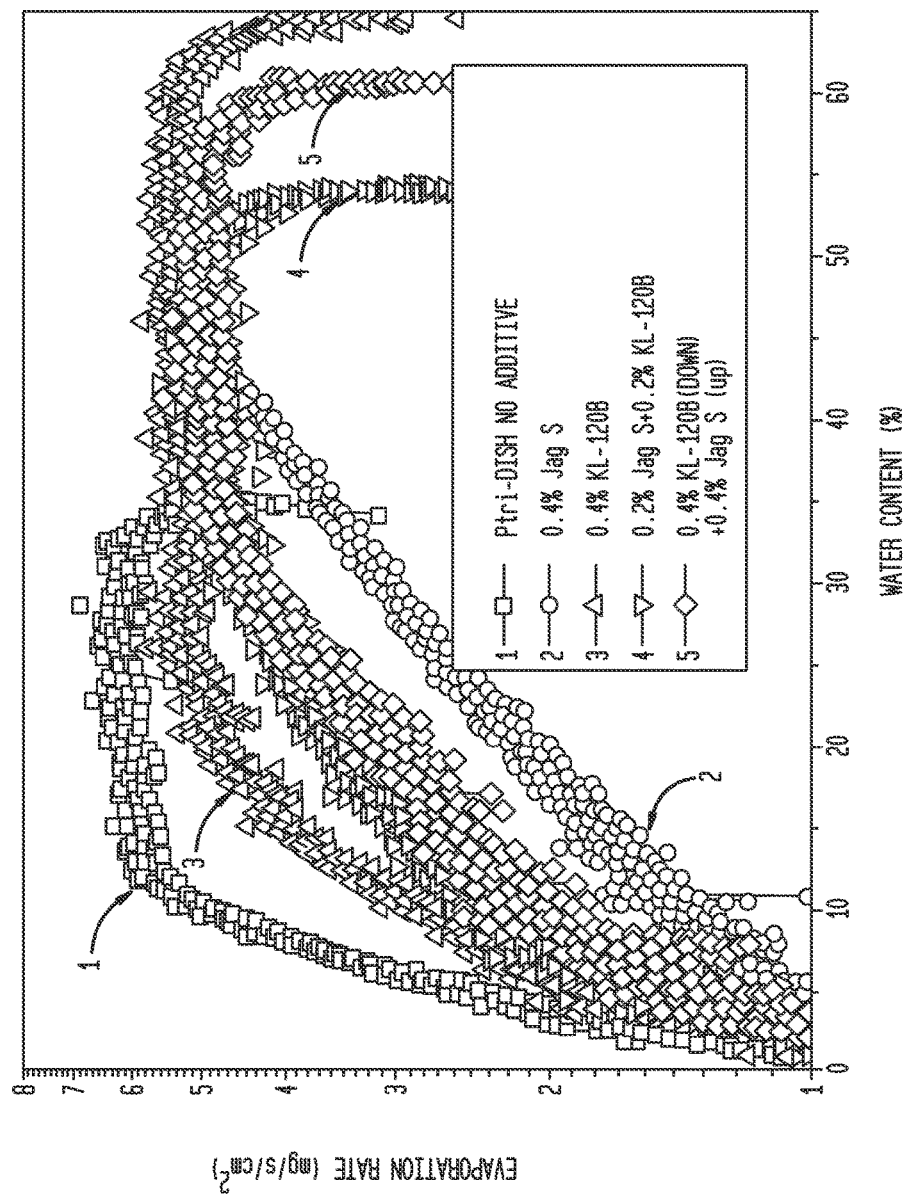
FIG. 4 is a graph illustrating evaporation rate (mg/s/cm$^2$) as a function of water content (%).

Referring to FIGS. 3 and 4, Jaguar S shows to be capable of slowing down the evaporation kinetics by almost a factor 3 when 0.4 wt % of guar (Jaguar S) is introduced in the soil.

FIG. 3 compares the bulk treatment (utilizing the bulk additive) with surface treatment (utilizing the surface additive) on untreated Shanxi soil. The several additives for the experiments conducted herein were: PolyEthyleneOxyde (PEO, Mw=20,000 g/mol); PolyEthyleneOxyde (PEO, Mw-1,000 g/mol); Aquarite ESL (Rhodia, Phosphonate End capped polymer); Starch (commercial flour from Shanghai supermarket); Jaguar S (from Rhodia); Agrho ExPol 1 (hydroxypropyl guar hydroxypropyl trimonium chloride); Polyacrylate (PAA, Mw=1,000,000 g/mol, trade name: KL-300, Chinese supplier); Polyacrylate (PAA, Mw=3,000,000 g/mol, trade name: KL-120B, Chinese supplier).

Figure 5:
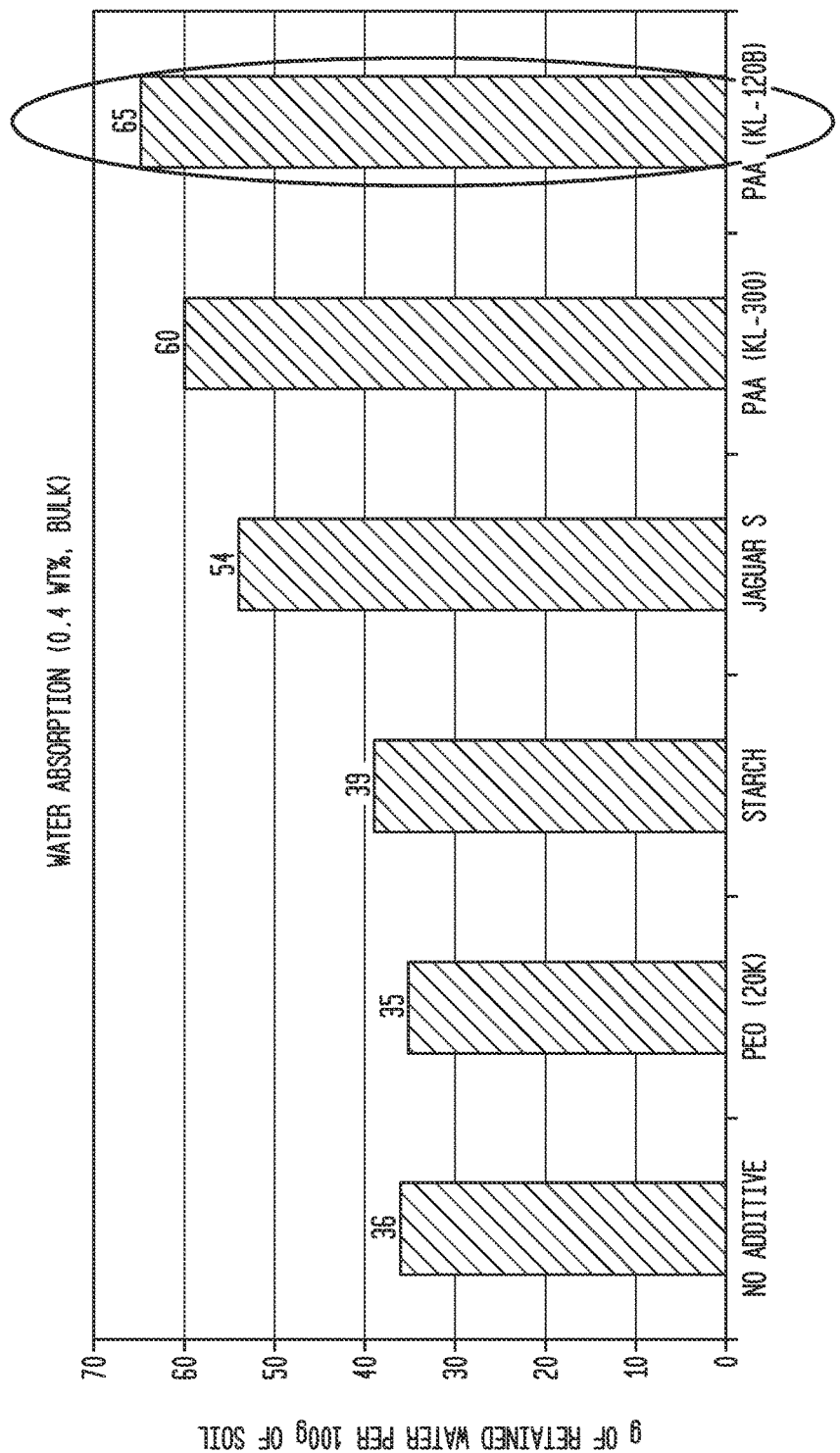
FIG. 5 is a graph illustrating the water absorption for different bulk additives in washed Shanxi soil.
Figure 6:
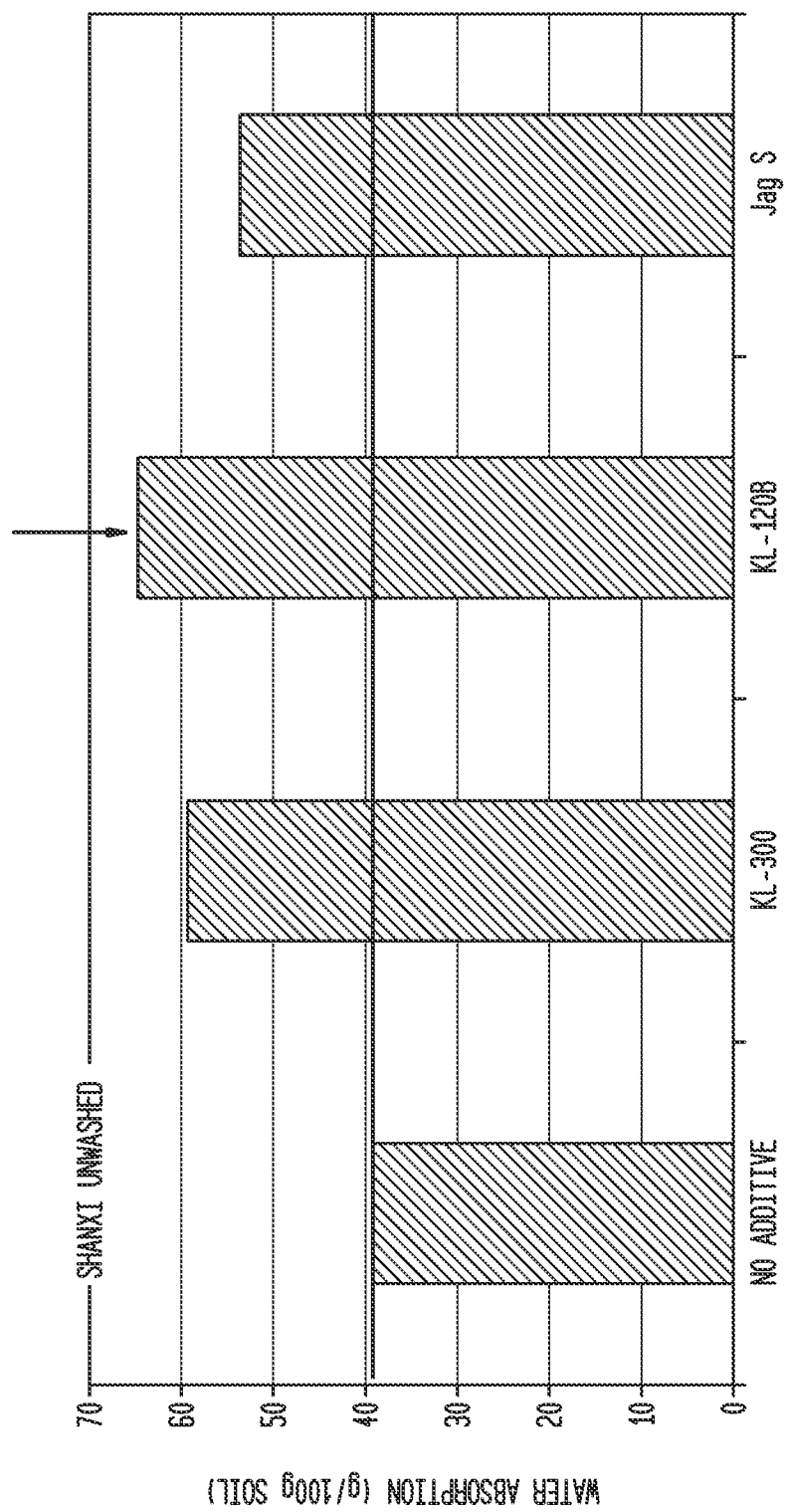
FIG. 6 is a graph illustrating the Initial water absorption for different bulk additives in unwashed Shanxi soil.

As explained above, in initial water absorption, the bulk additives help to absorb and retain more water in the soil as compared to the untreated soil without additive. Additives act as sponges and prevent water from draining. The chart as shown in FIG. 5 illustrates the gain in initially absorbed water in the soil for different additives. All these additives are used in the same conditions at 0.4 wt % in Shaanxi Washed soil. It is seen that Jaguar S shows water retention of around 25% as compared with the non-treated soil. Referring to FIG. 6, in non washed soils, PAANa of high molecular weight (KL-120B) performed better than Jaguar S.

Figure 7:
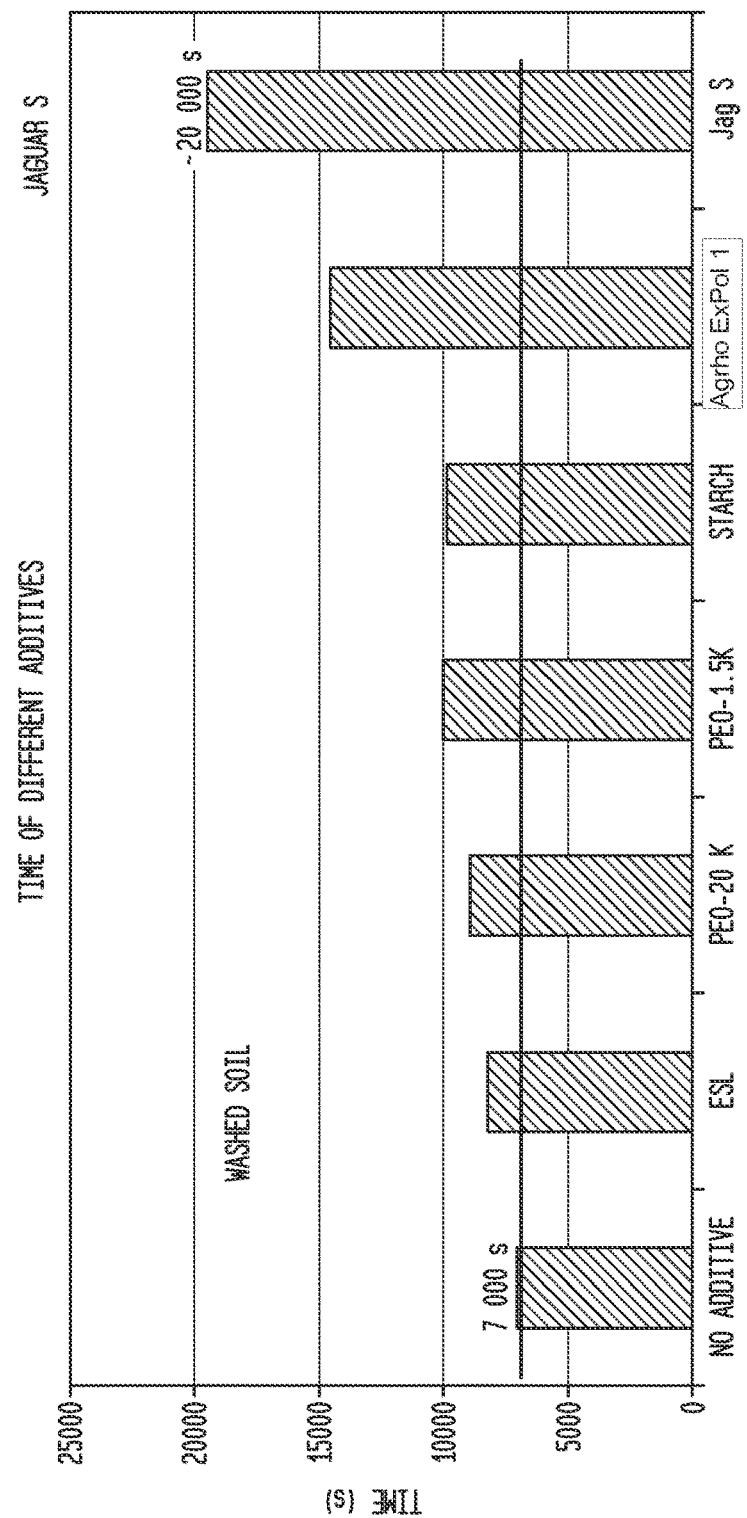
FIG. 7 illustrates the impact of bulk additives to evaporation kinetics in washed soils (Shanxi soils), where the evaporation time is the time needed to reach 1 wt % of remaining water.
Figure 8:
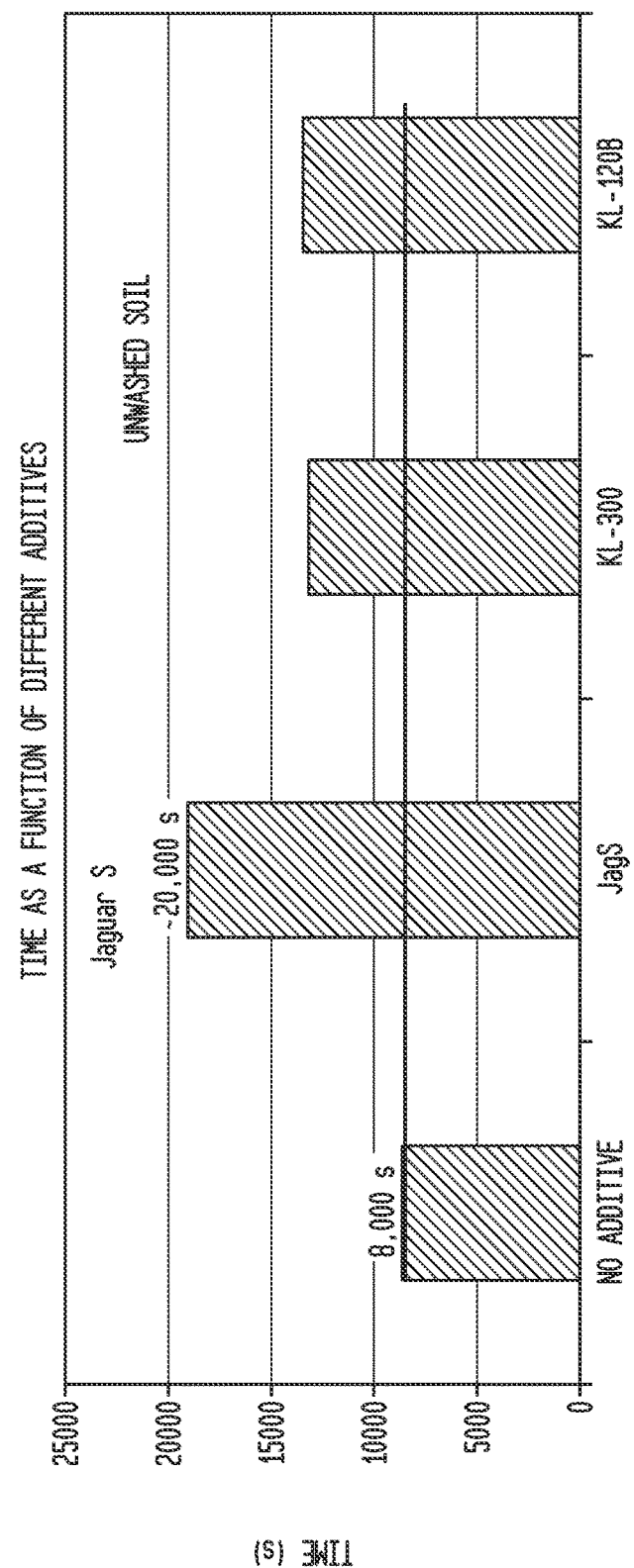
FIG. 8 illustrates the impact of bulk additives to evaporation kinetics in unwashed soil (Shanxi soil), where the evaporation time is the time needed to reach 1 wt % of remaining water.

As explained above, it is believed that a second factor relating to the increase of the evaporation time of soils (i.e., increased water absorption) is due to the change of the internal structure of the soils, wherein the moisture in the soil is wicked or pulled to the surface (i.e., evaporation front) and becomes lost to evaporation. Additives can clog some of the pores in the soil, and therefore can slow down the water transport towards the evaporation front. In the following figures we show non-modified and modified guars are capable of reducing evaporation in washed soils and in unwashed soils with respect to this second factor, as shown in FIGS. 7 and 8.

Figure 9:
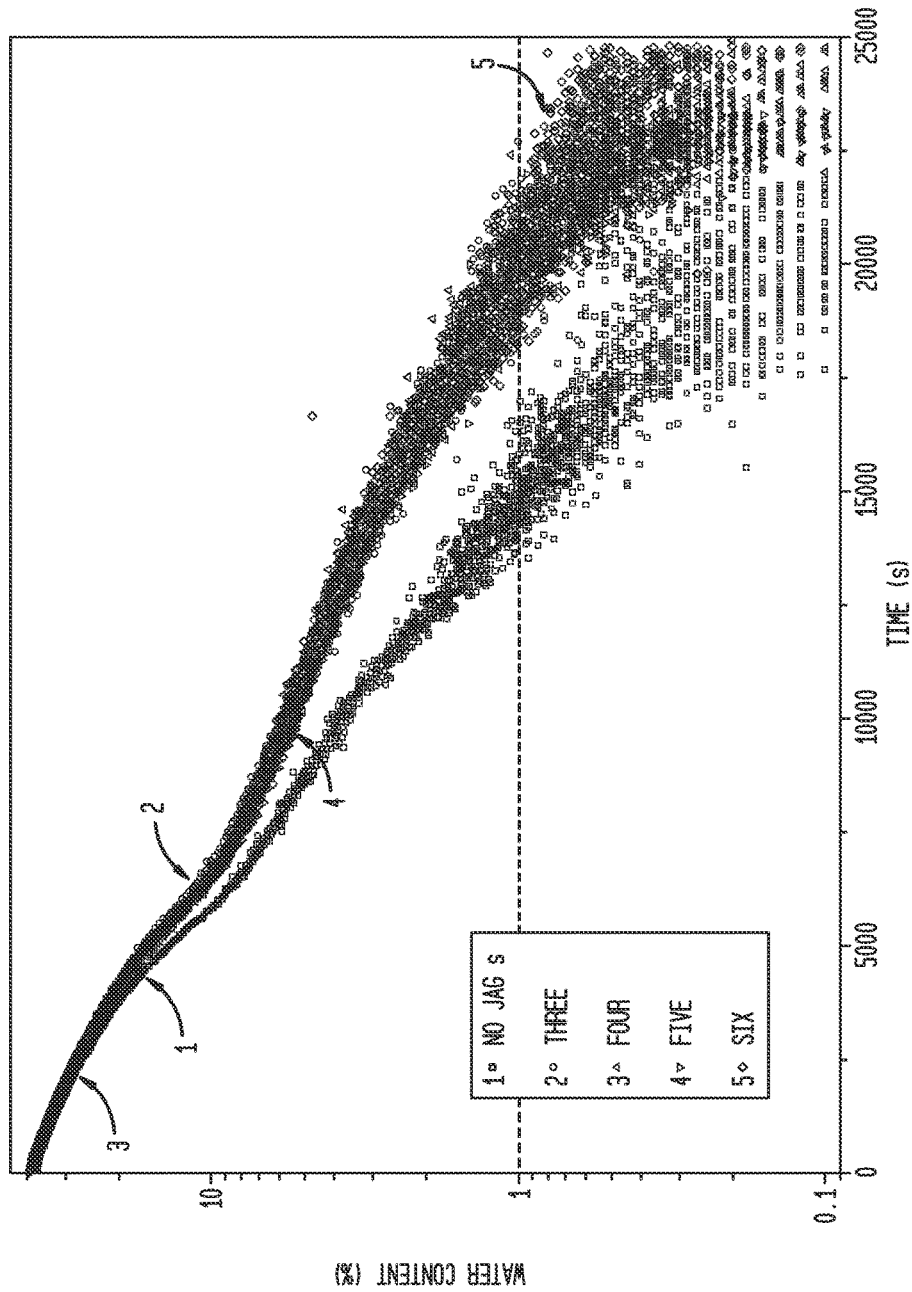
FIG. 9 is a graph illustrating the resistance of a soil additive to multiple washing cycles.

Referring to FIG. 9, FIG. 9 is a graph illustrating the stability or water resistance of Jaguar S (washed non-modified guar gum) used as a surface additive. It has been surprisingly found that guar gums have interesting water retention properties. Such additives when sprayed onto the surface of a targeted soil area only minimally lose the capacity for water retention after several cycles. Further, the layer formed by the additives are not prone to physical degradability, where the polymer dissolves in water destabilizing the semi-permeable layer after successive rain and dry cycles. Thus a semi-permeable top layer that is high stability or highly stable to physical degradation can be formed over a targeted soil area. The Jaguar S is shown in FIG. 9 to withstand different rain/drying cycles and have demonstrated that the semi-permeable layer (film) is stable up to six cycles (water washes).

Experiment—Effect of Surface Additive to Germination Rate

The sample preparation for the surface treatment is generally as follows for $1^{st}$, $2^{nd}$ and $3^{rd}$ round campaign experiments:

1: Put seed in dry soil under the surface 1 mm.
2: Spray aqueous polymer (with a polymer such as Agrho ExPol 1) solution on soil surface
3: Soak pot in water (30 minutes)
4: Filter excessive water
5: Put pot in greenhouse and start seedling The sample preparation for the surface treatment is generally as follows for $4^{th}$ round campaign experiments:
1: Soak dry soil in water (30 minutes)
2: Filter excessive water 3: Put seed in wet soil under the surface 1 mm.
4: Spray aqueous polymer (with a polymer such as Agrho ExPol 1) solution on soil surface
5: Put pot in natural condition (solar light and room temp. and start seedling)

Figure 10:
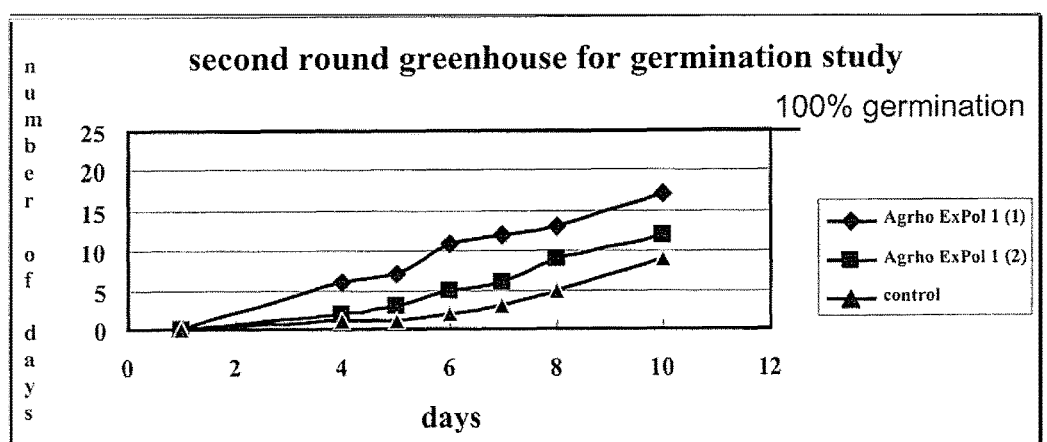
FIG. 10 is a graph showing the second round greenhouse germination study.

Referring to FIG. 10, the chart illustrates spraying a 0.4 wt % aqueous solution of surface additive on the surface of soil in which seeds were positioned at depth of 1 mm within the soil. The watering conditions were as follows:
- 10 mL water everyday for all the samples in three protocols.
- Five pots were used in each protocol and 110 g soil in every pot.
- This study was carrying out free of fertilizer to make the model simple, only including soil, water, seed and additive (required in some samples).
- Seeds were unexceptionally put 1 mm under soil surface.
- Temperature in greenhouse was maintained at 25 degree C.

Under the approach described above, it is observed that Agrho ExPol 1 (cationic guar) brings faster germination kinetics and highest final germination rate to *Brassica chinensis* seed as compared with the control sample (that contained no soil additive). The soil used in this test comes from ShanXi province and belongs to clayey soil type. In the first 10 days, the seeds of *Brassica chinensis* germinate with different kinetics. The sample with surface spray of 12.5 mL Agrho ExPol 1 aqueous solution (Agrho ExPol 1(1); 0.05 g of Agrho ExPol 1 in aqueous solution) shows the fastest germination kinetics which indicates the Agrho ExPol 1 additive is able to increase germination potential of *Brassica chinensis* seed. The seeding boost performance is also dependent on additive concentrations. If the dosage is lifted one time higher (Agrho ExPol 1(2); 0.1 g of Agrho ExPol 1 in aqueous solution), the performance is still higher than control soil but lower than Agrho ExPol 1(1) sample. Agrho ExPol 1(1) and Agrho ExPol 1(2) can give 70% and 50% final germination rate respectively while control soil gives only 35% rate. The surface area of soil is about 30 cm$^2$, corresponding to approximate dosages of about 150 and about 300 kg per hectare for Agrho ExPol 1(1) and Agrho ExPol 1(2), respectively.

The germination tests were carried out under sufficient watering condition which is 10 mL water per day to rule out the influence of water shortage on germination. Once the crop germinates faster, it can grow faster. At the 10$^{th}$ day, it was observed that the treated samples, Agrho ExPol 1(1) and Agrho ExPol 1(2), grow taller and appear healthier.

Figure 11:
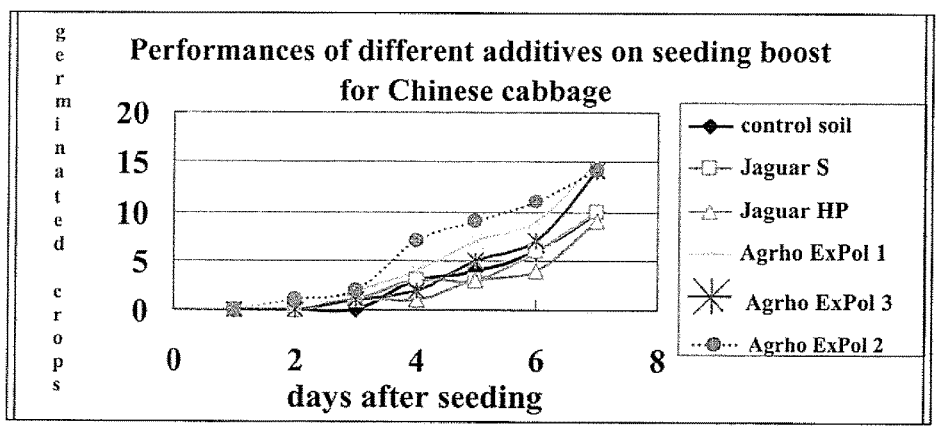
FIG. 11 is a graph showing the performance of different additives on germination rates of Chinese cabbage (*Brassica chinensis*).

Referring to FIG. 11, the number of germinated crops (of Chinese cabbage) in the first week is plotted as a function of days for different protocols.
Watering Conditions:
- 10 mL water everyday for all the samples in three protocols.
- Five pots were used in each protocol and 50 g soil in every pot.
- This study was carrying out free of fertilizer to make the model simple, only including soil, water, seed and additive (required in some samples).
- Dosage of additives is about 150 kg/ha to about 175 kg/ha.
- Seeds were unexceptionally put 1 mm under soil surface.
- Temperature in greenhouse is 25 degree.

Referring back to FIG. 11, it is observed that cationic guar, such as Agrho ExPol 1 and Agrho ExPol 2, as well as Agrho ExPol 3, showed increase germination kinetics and germination rates as compared with the control and non-cationic or underivatized guars such as Jaguar HP and Jaguar S, respectively.

Figure 12:
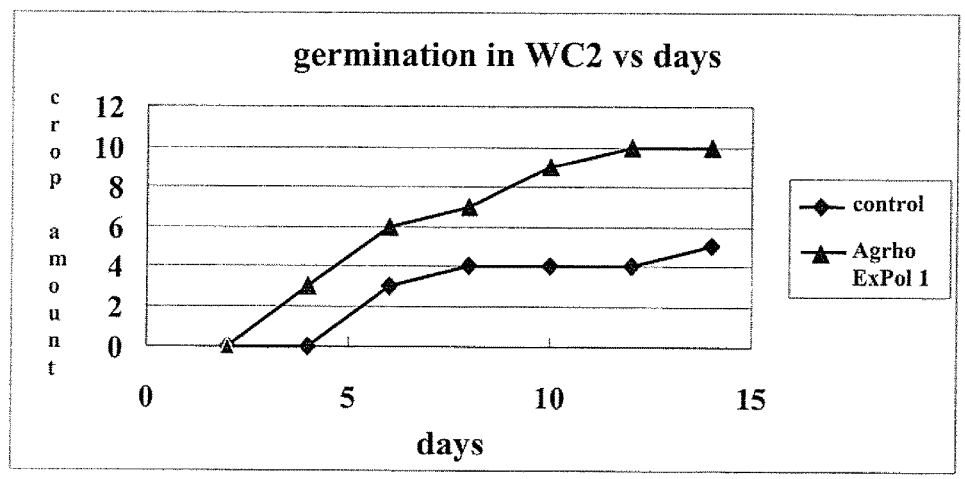
FIG. 12 is a graph showing the germination rates of Chinese cabbage (*Brassica chinensis*) under watering condition 2 (WC2) as a function of days.
Figure 13:
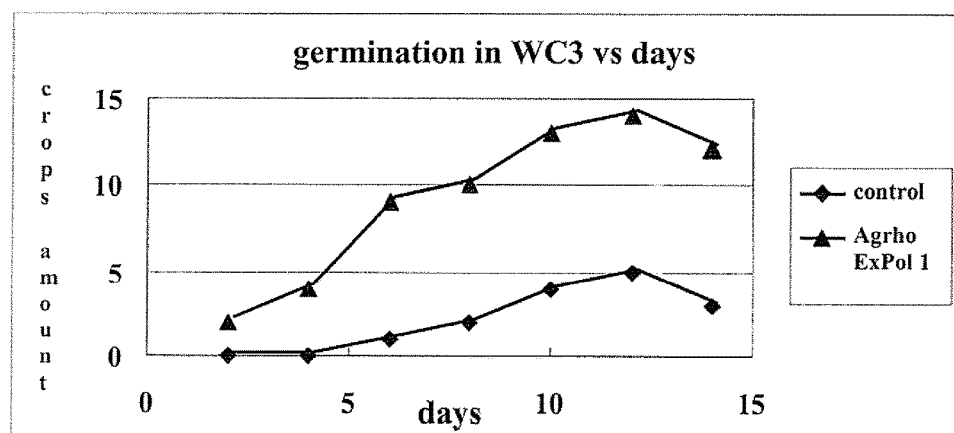
FIG. 13 is a graph showing the germination rates of Chinese cabbage (*Brassica chinensis*) under watering condition 3 (WC3) as a function of days.
Figure 14:
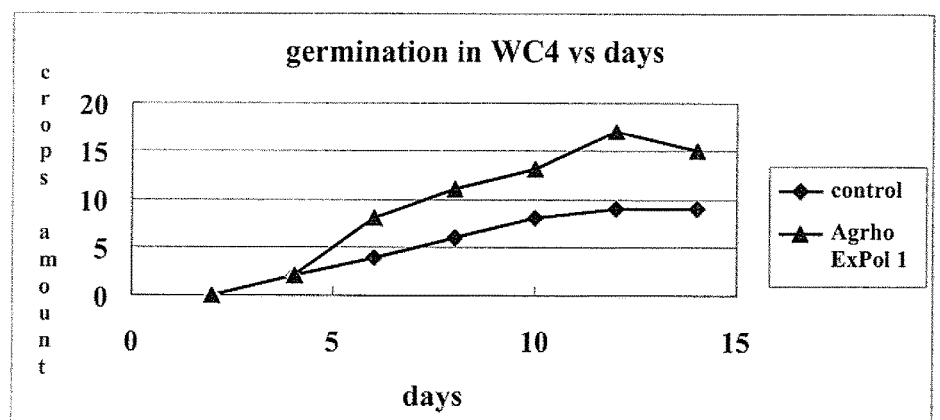
FIG. 14 is a graph showing the germination rates of Chinese cabbage (*Brassica chinensis*) under watering condition 4 (WC4) as a function of days.

Referring to FIGS. 12-14, increased germination rate (i.e., seeding boost) performance of Agrho ExPol 1 was also tested in different watering conditions. Watering condition 2 (WC2) provides 25 mL water every 3 days. Watering condition 3 (WC3) provides 25 ml water every 4 days. Watering condition 4 (WC4) provides 25 ml water every 5 days. From FIGS. 12-14, Agrho ExPol 1 is able to promote seed germination kinetics and final germination percentage in all the watering conditions as compared with the control. In sufficient watering condition, it is believed that the additive acts as a stimulator for seed. In harsh watering condition, the additive can retain water in soil by reducing evaporation rate and also stimulate seed to germinate.

Figure 15:
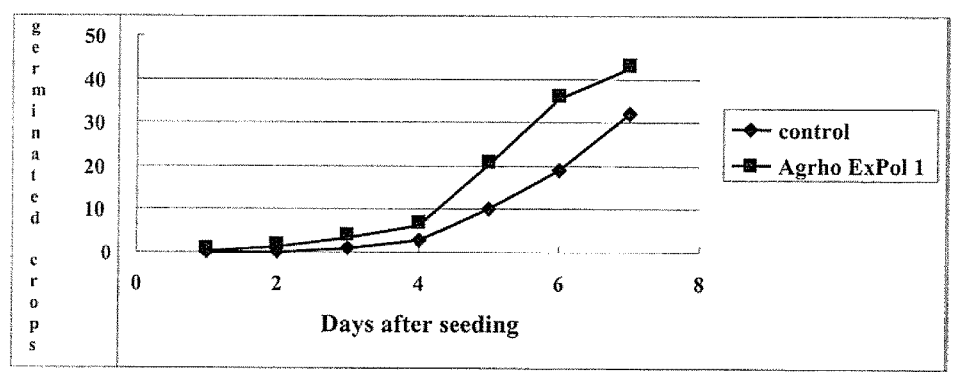
FIG. 15 is a graph showing the fourth round natural condition germination study.

Referring to FIG. 15, the number of germinated crops (Chinese cabbage) was plotted as a function of days for a fourth round experiment. Two treatments are control soil from ShanXi, surface spray 0.04 g of Agrho ExPol 1. Dosage is approximately 100 kg/ha.
Watering Conditions:
- 10 mL water everyday for all the samples in three protocols.
- 45 seeds were used in each treatment.
- Three pots were used in each treatment and 100 g soil in every pot.
- This study was carrying out free of fertilizer. Seeds were unexceptionally put 1 mm under soil surface.
- This test was conducted under natural condition (natural light and room temp. ~20 C.) (Used different batch of seed from seed connected with FIG. 10).

Referring back to FIG. 15, it is observed that Agrho ExPol 1 (cationic guar) under natural conditions (as compared with FIG. 10 under greenhouse conditions) brings faster germination kinetics and highest final germination rate to *Brassica chinensis* seed as compared with the control sample (that contained no soil additive).

It is understood that embodiments other than those expressly described herein come within the spirit and scope of the present claims. Accordingly, the invention described herein is not defined by the above description, but is to be accorded the full scope of the claims so as to embrace any and all equivalent compositions and methods.

The invention claimed is:

1. A method of decreasing water evaporation from soil, the method comprising:
   introducing a bulk additive to a target soil area; and
   contacting a top layer of the target soil area with a surface additive,
   wherein the step of introducing the bulk additive to a target soil area comprises applying the bulk additive to the surface of target soil area then mixing the bulk additive into the target soil area at a predetermined depth.

2. The method of claim 1, wherein the soil is selected from the group consisting of clay soil, sandy soil, silty soil, peaty soil, loamy soil, chalky soil and any combination thereof.

3. The method of claim 1, wherein the soil is clay soil.

4. The method of claim 1 wherein the soil is soil characterized by a mean particle diameter (D50) of less than or equal to 50 μm or 25 μm or 5 μm.

5. The method of claim 1, wherein the bulk additive is poly(acrylic acid).

6. The method of claim 1, wherein the surface additive is selected from polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, guar, unwashed guar gum, washed guar gum, cationic guar, carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar), guar hydroxypropyl trimonium chloride, hydroxypropyl guar hydroxypropyl trimonium chloride, starch, corn, wheat, rice, potato, tapioca, waxy maize, sorghum, waxy sarghum, sago, dextrin, chitin, chitosan, alginate compositions, xanthan gum, carageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, cationic hydroxyethyl cellulose, cationic starch, a derivative of any of the foregoing or a combination of any of the foregoing.

7. The method of claim 1, wherein the bulk additive is a polymer according to formula:

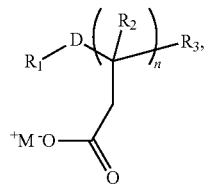

wherein n is an integer of from 1 to 1000; wherein R1 comprises at least one phosphonate group, silicate group, siloxane group, phosphate group, phosphinate group or any combination thereof; wherein R2 or R3 are each independently a hydrogen, or a branched, linear or cyclic C1-C6 hydrocarbon with or without heteroatom; M+ is a counterion or hydrogen; wherein "D" is absent, a linear or branched C1-C5 hydrocarbon group, a C1-C5 alkoxy group, oxy group (—O—), iminyl (—NH—), or substituted iminyl (—NR—), wherein R a C1-C6 alkyl, a C1-C6 alkoxyl, a C1-C6 hydroxylalkyl, a C1-C6 alkoxyalkyl or a C1-C6 alkylalkoxyl.

8. A method of decreasing water evaporation from soil, the method comprising:
introducing a bulk additive to a target soil area; and
contacting a top layer of the target soil area with a surface additive,
wherein the step of introducing the bulk additive to a target soil area comprises:
preparing a mixture comprising the bulk additive and a pre-mix soil and thereafter contacting the mixture with the target soil area.

9. A method of decreasing water evaporation from soil, the method comprising:
introducing a bulk additive to a target soil area; and
contacting a top layer of the target soil area with a surface additive,
wherein contacting the top layer of soil comprises spraying an aqueous mixture comprising the surface additive onto the soil.

10. The method of claim 9, wherein the aqueous mixture further comprises an adjuvant, surfactant, fertilizer, pesticide, or a combination of any of the foregoing.

11. The method of claim 9, wherein the step of introducing the bulk additive to a target soil area comprises applying the bulk additive to the surface of target soil area then mixing the bulk additive into the target soil area at a predetermined depth.

12. The method of claim 9, wherein the bulk additive is a polymer according to formula:

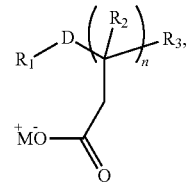

wherein n is an integer of from 1 to 1000; wherein R1 comprises at least one phosphonate group, silicate group, siloxane group, phosphate group, phosphinate group or any combination thereof; wherein R2 or R3 are each independently a hydrogen, or a branched, linear or cyclic C1-C6 hydrocarbon with or without heteroatom; M+ is a counterion or hydrogen; wherein "D" is absent, a linear or branched C1-C5 hydrocarbon group, a C1-C5 alkoxy group, oxy group (—O—), iminyl (—NH—), or substituted iminyl (—NR—), wherein R a C1-C6 alkyl, a C1-C6 alkoxyl, a C1-C6 hydroxylalkyl, a C1-C6 alkoxyalkyl or a C1-C6 alkylalkoxyl.

13. A method of decreasing water evaporation from soil, the method comprising:
introducing a bulk additive to a target soil area; and
contacting a top layer of the target soil area with a surface additive,
wherein the bulk additive is in a semi-dry form.

14. The method of claim 13, wherein the step of introducing the bulk additive to a target soil area comprises applying the bulk additive to the surface of target soil area then mixing the bulk additive into the target soil area at a predetermined depth.

15. The method of claim 13, wherein contacting the top layer of soil comprises spraying an aqueous mixture comprising the surface additive onto the soil.

16. The method of claim 13, wherein the bulk additive is in granular form.

17. The method of claim 13, wherein the surface additive is in granular form.

18. The method of claim 13, wherein the bulk additive encapsulates all or a portion of a seed.

19. The method of claim 13, wherein the bulk additive is applied by itself or with the surface additive.

20. The method of claim 13, wherein the surface additive is applied in semi-dry form.

21. A method of decreasing water evaporation from soil, the method comprising:
introducing a bulk additive to a target soil area; and
contacting a top layer of the target soil area with a surface additive,
wherein the bulk additive is selected from the group consisting of unwashed guar gum, washed guar gum, polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, a derivative of any of the foregoing and a combination of any of the foregoing.

22. The method of claim 21, wherein the step of introducing the bulk additive to a target soil area comprises applying the bulk additive to the surface of target soil area then mixing the bulk additive into the target soil area at a predetermined depth.

23. The method of claim 21, wherein contacting the top layer of soil comprises spraying an aqueous mixture comprising the surface additive onto the soil.

24. The method of claim 21, wherein the bulk additive is in a semi-dry form.

25. The method of claim 21, wherein the bulk additive is in granular form.

26. The method of claim 21, wherein the surface additive is in granular form.

27. The method of claim 21, wherein the bulk additive encapsulates all or a portion of a fertilizer or fertilizer granule.

28. The method of claim 21, wherein the bulk additive is applied by itself or with the surface additive.

29. The method of claim 21, wherein the surface additive is applied in semi-dry form.

30. A method of improving germination rates agricultural or horticultural yield by decreasing water evaporation from a target soil area, the method comprising:
  i) mixing into a target soil area a bulk additive selected from the group consisting of polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, unwashed guar gum, washed guar gum, hydroxypropyl guar gum, carboxymethyl guar gum, carboxymethylhydroxypropyl guar gum, starch, corn, wheat, rice, potato, tapioca, waxy maize, sorghum, waxy sarghum, sago, dextrin, chitin, chitosan, alginate compositions, xanthan gum, carageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing and a combination of any of the foregoing; and
  ii) spraying an aqueous mixture containing a surface additive onto a top layer of the target soil area, the surface additive selected from the group consisting of polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, guar, unwashed guar gum, washed guar gum, cationic guar, carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar), guar hydroxypropyl trimonium chloride, hydroxypropyl guar hydroxypropyl trimonium chloride, starch, corn, wheat, rice, potato, tapioca, waxy maize, sorghum, waxy sarghum, sago, dextrin, chitin, chitosan, alginate compositions, xanthan gum, carageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing and any combination of any of the foregoing.

* * * * *